United States Patent [19]

Sonehara et al.

[11] Patent Number: 5,053,765
[45] Date of Patent: Oct. 1, 1991

[54] LIGHT GUIDE TYPE DISPLAY APPARATUS

[75] Inventors: Tomio Sonehara; Jun Sugiyama; Shinji Morozumi, all of Suwa, Japan

[73] Assignee: Seiko Epson Corporation, Tokyo, Japan

[21] Appl. No.: 294,082

[22] Filed: Jan. 6, 1989

[30] Foreign Application Priority Data

Jan. 11, 1988 [JP] Japan .................................. 63-3477
Jan. 14, 1988 [JP] Japan .................................. 63-5902
Jan. 19, 1988 [JP] Japan .................................. 63-8897
Jan. 25, 1988 [JP] Japan .................................. 63-14253
Jan. 26, 1988 [JP] Japan .................................. 63-14833
Aug. 26, 1988 [JP] Japan .................................. 63-211636

[51] Int. Cl.$^5$ ............................................. G09G 3/20
[52] U.S. Cl. ................................ 340/815.31; 340/716; 340/795; 358/901; 362/32
[58] Field of Search ............... 340/815.31, 702, 757, 340/716, 794, 795, 784, 705; 350/96.28, 331 R, 345, 339 F, 96.24, 96.25, 96.27; 362/32; 358/901, 230, 231, 232, 241, 242

[56] References Cited

U.S. PATENT DOCUMENTS

| | | | |
|---|---|---|---|
| 3,043,910 | 7/1962 | Hicks, Jr. .......................... | 178/7.85 |
| 3,141,105 | 7/1964 | Courtney-Pratt ................... | 313/68 |
| 3,644,922 | 2/1972 | James et al. ....................... | 340/757 |
| 4,116,739 | 9/1978 | Glenn ................................. | 156/169 |
| 4,208,096 | 6/1980 | Glenn, Jr. .......................... | 350/96.25 |
| 4,257,041 | 3/1981 | Masucci ............................. | 340/815.31 |
| 4,378,955 | 4/1983 | Bleha, Jr. et al. ................. | 350/334 |
| 4,521,771 | 6/1985 | Alton ................................. | 340/815.31 |
| 4,650,280 | 3/1987 | Sedlmayr ........................... | 350/96.27 |
| 4,735,495 | 4/1988 | Henkes ............................... | 350/345 |
| 4,824,214 | 4/1989 | Ledebuhr ........................... | 350/331 R |
| 4,839,635 | 6/1989 | Harris et al. ....................... | 340/815.31 |
| 4,850,685 | 7/1989 | Kamakura et al. ................. | 350/397 |

FOREIGN PATENT DOCUMENTS 56-43681 4/1981 Japan .
61-99118 5/1986 Japan .

OTHER PUBLICATIONS

"Thermally Addressed Electrically Erased High-Resolution Liquid Crystal Light Valves", by H. Melchior et al., *Appl. Phys. Lett.*, vol. 21, No. 8 (Oct. 15, 1972), pp. 392-394.

"A High Resolution Large Screen Projection Display Using a Semi-Conductor Laser Addressed LCLV", by K. Kubota et al., *Television Society Technical Report*, OPT-216 (Jan., 1986), pp. 1-6.

Nikkei Electronics published 9/10/84, pp. 211-240, No. 351.

"A Fiber-Optic Magnifying Display Panel", by William E. Glenn, SID 83 Digest, pp. 46-47.

"Television Displays for Stadiums", by William E. Glenn, Information Display, 1/87, pp. 22-25.

Primary Examiner—Jeffrey A. Brier
Attorney, Agent, or Firm—Blum Kaplan

[57] ABSTRACT

A light guide type display apparatus having a plurality of optical fibers which couple a light shutter which serves as an image forming device to a display screen. The plurality of optical fibers are effectively interlaced with each other so as to substantially eliminate any boundaries which appear on the display screen. The plurality of optical fibers are segregated into bundles which correspond to at least one trio of blue, green and red picture elements.

63 Claims, 16 Drawing Sheets

FIG. 12
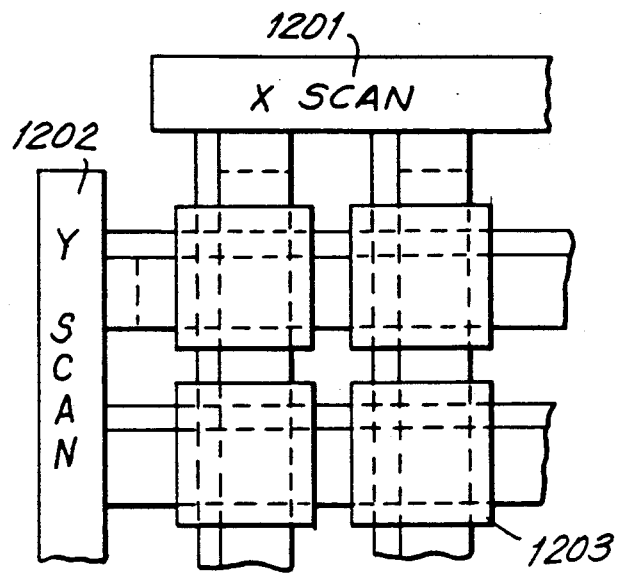
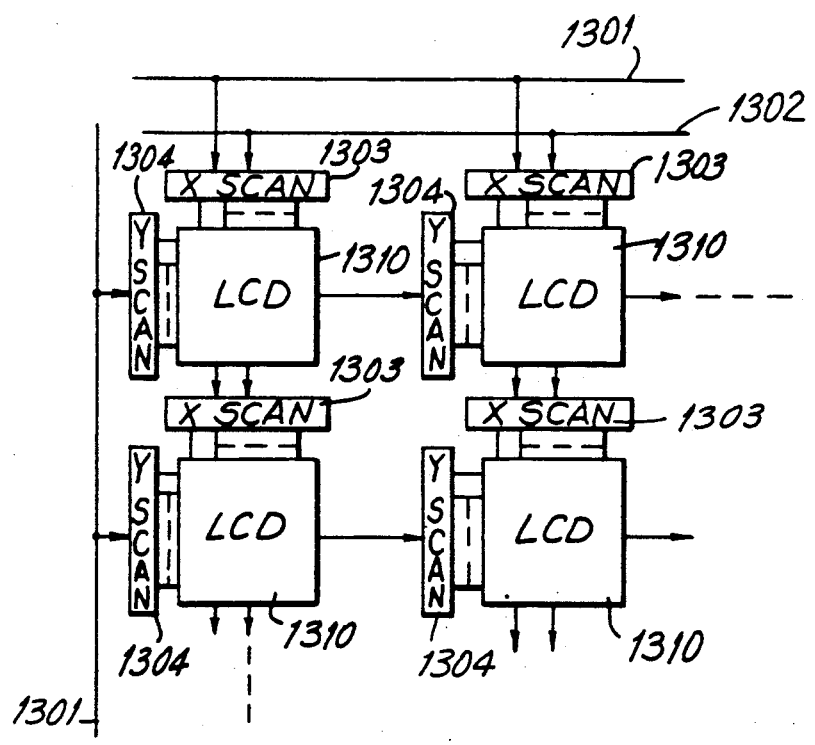
FIG. 13

LIGHT GUIDE TYPE DISPLAY APPARATUS

BACKGROUND OF THE INVENTION

This invention relates generally to a display apparatus, and more particularly to a light guide type display apparatus.

A conventional light guide type display apparatus includes a plurality of blocks, each block formed by bundling together a plurality of optical fibers. As disclosed in U.S. Pat. No. 4,650,280, the blocks are simply stacked together to form a display screen.

The overall length of these optical fibers is relatively long. An increase in the production cost of the apparatus results. Boundaries created by the discontinuities between the blocks of bundled optical fibers and linear patterns formed by the unevenness in the levels of luminance which appear on the screen degrade the quality of the displayed image.

Accordingly, it is desirable to provide a light guide type display apparatus which reduces the overall length of the optical fibers used, minimizes discontinuities created between the blocks of bundled optical fibers and substantially eliminates the unevenness in the level of luminance appearing on the screen.

SUMMARY OF THE INVENTION

Generally speaking, in accordance with the invention, a light guide type display apparatus includes an image forming device for forming an image; a display screen for displaying the image and including a plurality of individual display surfaces; and a plurality of optical fibers which couple the image forming device to the display screen and thereby serve as a light guide between the image forming device and display screen. The plurality of optical fibers are effectively interlaced together.

Preferably, a light shutter is used as the image forming device. Each of the optical fibers has an end face which together serve as the display screen. A number of optical fibers are bundled together to form a modular unit of optical fibers. Accordingly, the light guide includes a plurality of these modular units. The units are interlaced with each other to suppress the generation of the aforementioned boundaries and linear patterns appearing on the screen.

In one embodiment of the invention, the present level of light produced by the image forming device is detected and used in calculating a new level of luminance for the entire display screen. Feedback circuitry communicates this new level of luminance to the image forming device.

In another embodiment of the invention, a plurality of image forming devices are driven in parallel with display data serially distributed to each image forming device. The display data is stored in an image memory device.

The image forming device can include a light source and a light shutter such as one or more liquid crystal panels. An angle ($\Theta$) at which light from the light shutter strikes an incident face of each optical fiber is about 30° or less. Angle $\Theta$ is set to provide maximum contrast in the image to be displayed. The light shutter has a plurality of picture elements. The optical path length from the light shutter to the plurality of optical fibers is equal to or less than a value obtained by dividing the picture element length by tan $\Theta$.

Certain optical fibers serve as aligning marks for aligning the light shutter with the plurality of optical fibers. Alternatively, the incident faces of the optical fibers and surface of the light shutter can be shaped to mate with each other (e.g. convex and concave).

An additional light guide is used to optically couple the light source and light shutter together. The additional light guide is made from another plurality of optical fibers which surround the light source. To compensate for the nonuniformity in luminance radiating from the surface of the light source, the optical fibers forming the additional light guide are irregularly spaced about light source surface.

Accordingly, it is an object of the invention to provide an improved light guide type display apparatus whose production cost compared to a conventional light guide type display apparatus is substantially less.

It is another object of the invention to provide an improved light guide type display apparatus which reduces the overall length of the plurality of optical fibers required to couple the image forming device to the display screen as compared to a conventional light guide type display apparatus.

It is a further object of the invention to provide a improved light guide type display apparatus which provides a uniform and high quality display.

It is yet another object of the invention to provide an improved light guide type display apparatus which minimizes boundaries appearing on the screen created by discontinuities between blocks of bundled optical fibers and substantially eliminates linear patterns formed by the unevenness in the levels of luminance appearing on the screen resulting in a displayed image of high quality.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangements of parts which are adapted to effect such steps all as exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings in which:

FIG. 12 is a fragmented block diagram of a driving circuit for the light shutter of FIG. 10;

FIG. 13 is a fragmented block diagram of an alternative driving circuit of FIG. 10;

DESCRIPTION OF THE PREFERRED EMBODIMENTS

Embodiment 1

Figure 1:
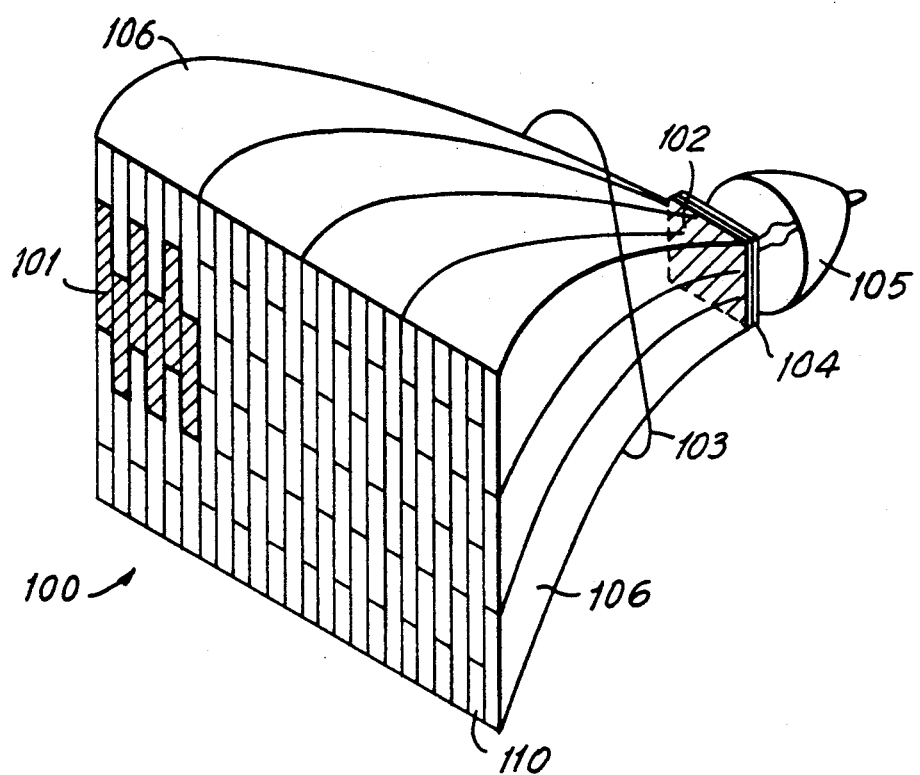
FIG. 1 is a perspective view of a light guide type display apparatus in accordance with a first embodiment of the invention.

As shown in FIG. 1, a light guide type display apparatus 100 includes a light guide 103 having a plurality of light guide members. The light guide members are divided into a plurality of units 106. Each unit 106 has an incident face and exit face. Each exit face serves as one of a plurality of blocks 101 of a display screen 110. A light shutter 104 is optically coupled to display screen 100 by light guide 103. Blocks 101 are effectively interlaced with each other on display screen 110. The incident faces of units 106 taken together form an image input end 102 of light guide 103 which is coupled to light shutter 104. A liquid crystal display (LCD) serves as light shutter 104. Apparatus 100 also includes a light source 105 which transmits light flux towards light shutter 104.

Light guide 103 transmits light flux between light shutter 104 and display screen 110. Each light guide member of unit 106 has a distal end which is used to form one of blocks 101 and a proximate end used to form one of the incident faces of unit 106. Each light guide member defines one picture element at its proximate or distal end. Suitable light guide members include optical fibers and, preferably, plastic optical fibers because of their weight, cost, flexibility and formability.

Figure 2:
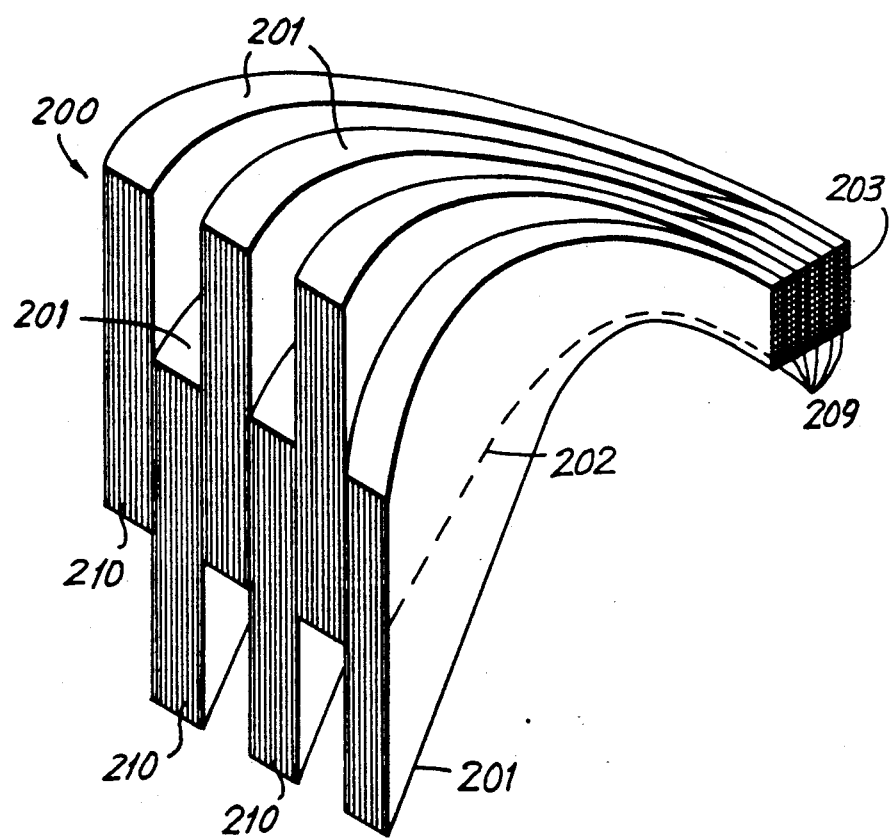
FIG. 2 is a perspective view of one block of a light guide.

FIG. 2 is a perspective view of that portion of a block 200 of light guide 103. Block 200 includes a plurality of optical fiber bundles 201. Each fiber bundle 201 has an incident face 209 and exit face 210 and includes 30 sheets, each sheet including 180 optical fibers 202. Fiber bundles 201 are staggered (i.e. alternately shifted) so that the exit faces of optical fiber bundles 201 are regularly interlaced with each other.

Optical fiber bundles 201 are not shifted at their incident faces 209 such that an image input end 203 of block 200 has a rectangular cross sectional area. End 203 faces and is attached to the display surface of light shutter 104. The image from each picture element of light shutter 104 (i.e. a piece of information) which enters end 203 is in an order reverse to the order in which the image appears at exit faces 210 of block 200. More particularly, to compensate for the shift in (i.e., interlacing of) the image displayed at exit faces 210 of block 200, the image entering image input end 203 must be in reverse order to the shift produced by the light guide to ensure a normal display of the image at exit faces 210.

Figure 3:
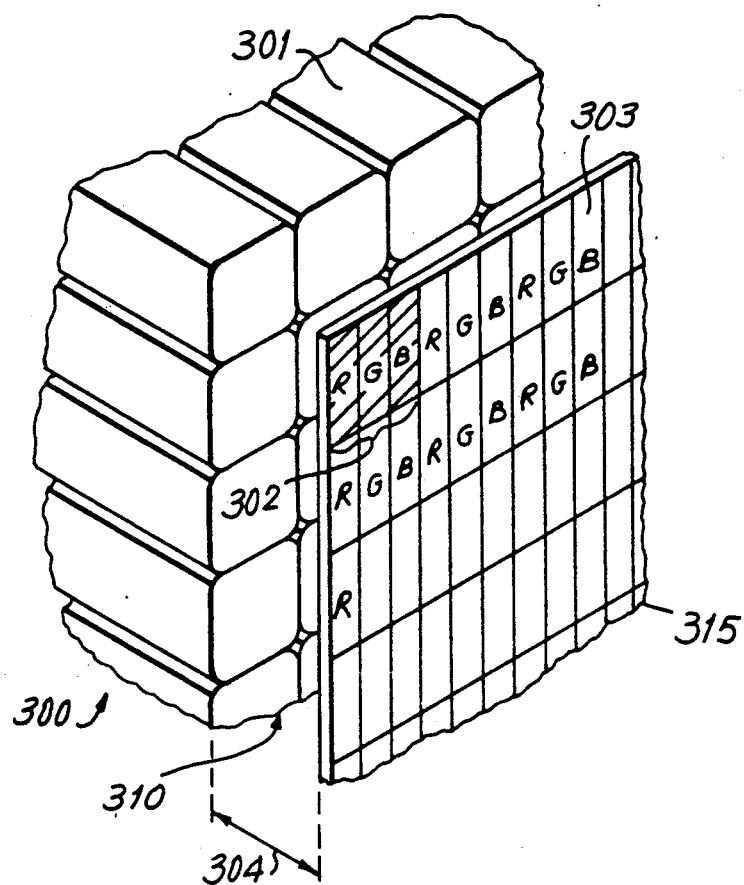
FIG. 3 is a fragmented perspective view at the junction between the light guide and light shutter.

As shown in FIG. 3, a light guide 300 having an image input end 310 includes a multiplicity of closely stacked fibers 301. Image input end 310 is formed from the rectangular ends of fibers 301. For illustrative purposes only, a space 304 has been provided between each fiber 301 forming image input end 310 and a light shutter 315. In practice, however, image input end 310 is in close contact with light shutter 315.

Light shutter 315 includes a plurality of red (R), green (G) and blue (B) picture elements 303. R, G and B picture elements 303 form a trio 302. The cross sectional configuration of each fiber 301 is designed so that each trio 302 of R, G and B picture elements 303 corresponds to one of the plurality of fibers 301.

Optical fibers 301 are bundled together to form a block as defined by Table 1 as follows:

TABLE 1

| Fibers | plastic fibers<br>outer diameter: 0.5 mm |
|---|---|
| Exit Face | linear magnifying power with respect to incident face 5:1<br>½ shift; RGB mixed transmission |
| Incident face | rectangularly compression-formed fiber bundle; rectangular cross-section |
| Number of pixels | 180 × 180 (units of trio of R, G and B) |
| Number of fibers | 180 × 180 |

The plurality of trios 302 form a striped color filter 303. Alternatively, a mosaic color filter can be used provided that a trio of R, G and B picture elements corresponds to each fiber 301. The cross-sectional configuration of each fiber 301 need not be rectangular. Other cross-sectional configurations can be used, however, a lower optical coupling efficiency can result.

Figure 4:
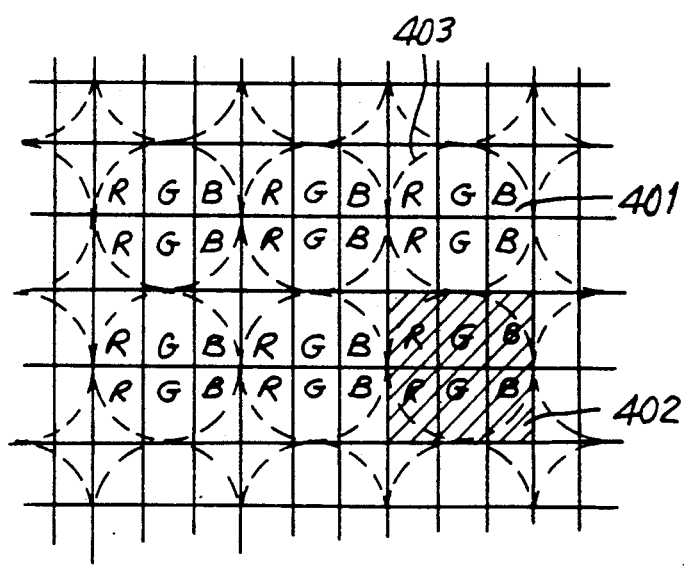
FIG. 4 is a diagrammatic elevational view of the light shutter.

As shown in FIG. 4, each fiber can correspond to a multiplicity of picture elements 401. Six picture elements 401 forming two trios of R, G and B picture elements, are included within one of a plurality of groups 402. One group 402 is shown hatched. Each group 402 corresponds to an optical fiber 403 represented by a broken circular line. The pieces of information assigned to picture elements 401 of one group 402 are added together at the proximate end of each optical fiber 403 (i.e., the image input end of the light guide). Not all six pieces of information are required to provide sufficient color information at the proximate end of each optical fiber 403. Accordingly, any resulting degradation due to less than all of the information from the six picture elements 401 being added together at the proximate end of optical fiber 403 is minimized. The light shutter also provides the same information to each pair of picture elements R, G and B within a single group 402. This redundancy in information permits a reduction in the amount of information required to be displayed for each LCD of the light shutter.

Figure 5:
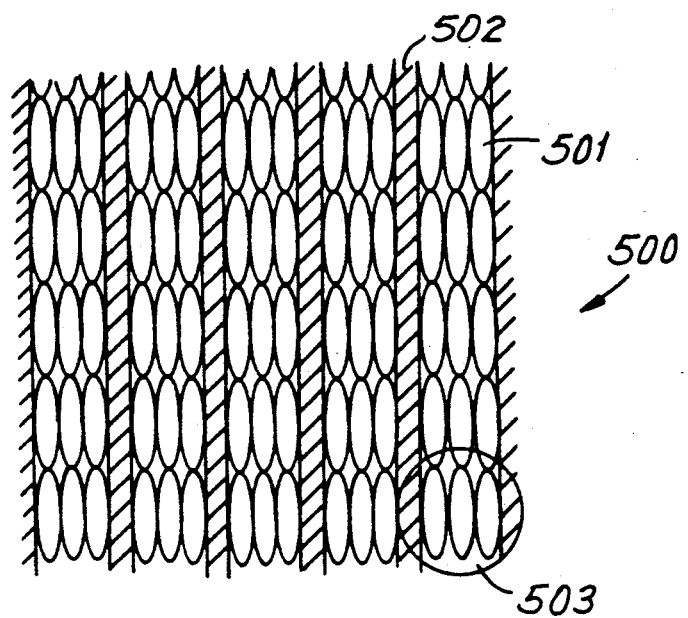
FIGS. 5(a) and 5(b) are fragmented sectional views of the display screen in accordance with alternative embodiments of the invention.
Figure 5:
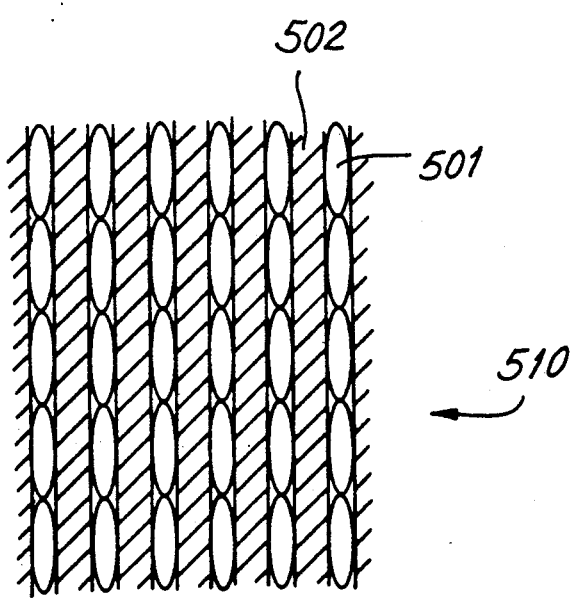

FIGS. 5(a) and 5(b) are enlarged cross-sectional views of a portion of a pair of display screens 500 and 510, respectively. A plurality of optical fibers 501 are clamped between a plurality of spacers 502 such that the distal ends of fibers 501 are aligned in a plurality of columns with one or more optical fibers 501 in each row. As shown in FIG. 5(a), each row of optical fibers 503 of display screen 500 includes three optical fibers 503 associated with picture elements R, G and B clamped between a pair of spacers 502. As shown in FIG. 5(b), a single optical fiber 501 associated with picture elements R, G and B is included in each row and is clamped between a pair of spacers 502. Spacers 502 are designed to absorb light to minimize interference from light which leaks from one or more neighboring optical fibers 501. Based on experimental results in which spacers 502 were dyed various colors, spacers 502 dyed black appear to absorb the greatest amount of light. Gaps produced on display screen 110 due to magnification also appear inconspicuous when spacers 502 are dyed black which improves the clarity of the displayed image.

By interposing a spacer between each pair of adjacent columns of optical fibers or by obliquely cutting the optical fibers at their distal ends the image can be magnified. Preferably, the image formed by light shutter 104 is magnified by horizontally and vertically interposing spacers as well as obliquely cutting the optical fibers to form a display screen. Blocks 101 are then stacked to form display screen 110 as shown in FIG. 1.

To improve the uniformity of the distal end surfaces of the optical fibers forming the display screen, the distal ends of each optical fiber are subjected altogether (i.e., as a lump) to a process for controlling the light exit direction. Well known processes for controlling the exit direction include, but are not limited to, sawtooth finishing, sanitizing and sandblasting. In this first embodiment of the invention, the distal ends of the optical fibers are subjected at one time as a single lump to sandblasting to carry out a diffusion treatment of the distal ends.

Figure 6:
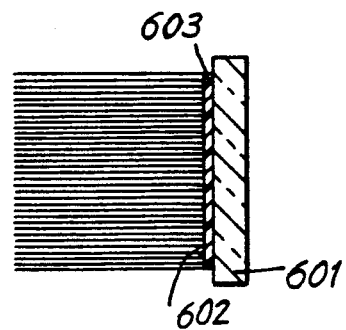
FIG. 6 is an elevational view of the junction between the light guide and light shutter.

As shown in FIG. 6, a light shutter 601 is coupled to an incident face 602 of a bundle of optical fibers 605. To minimize unnecessary reflection at the interface between light shutter 601 and optical fiber incident face 602, optical fiber bundle 605 and light shutter 601 are tightly coupled together through use of an optical coupling material 603. Optical coupling efficiency is enhanced when optical coupling material 603 has a refractive index substantially equal to the core of each optical fiber. Preferably, a silicone resin material having a refractive index of 1.49 is used as optical coupling material 603.

Figure 7:
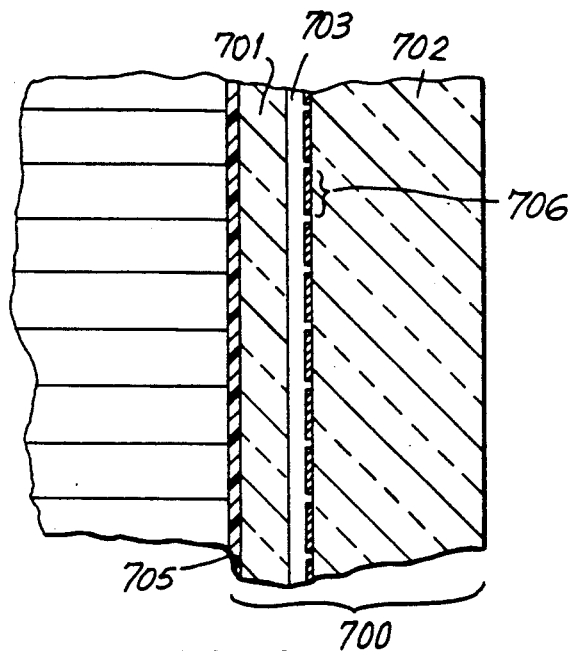
FIG. 7 is a sectional view of the junction between the light guide and light shutter in accordance with one embodiment of the invention.

FIG. 7 is an enlarged view of the junction between a light shutter 700 and a bundle of optical fibers 710. An LCD serves as light shutter 700 and includes a pair of opposing transparent substrates 701 and 702. Transparent substrate 701 has electrodes disposed on its surface. A liquid crystal layer 703 fills in the gap between transparent substrates 701 and 702. Light shutter 700 is coupled at the image input end of optical fiber bundle 710 by a coupling material 705. A plurality of electrodes 706 on transparent substrate 702 correspond to the plurality of picture elements such as, but not limited to, trio.

The optical coupling distance is increased due to transparent substrate 701 being interposed between the picture elements and the image input end of optical fiber bundle 710. Consequently, a one to one correspondence between information transmitted from one picture element and one of the optical fibers of bundle 710 can be difficult to maintain. Maintaining this one to one correspondence is achieved as follows:

An angle θ at which light enters the bundle of optical fibers 710 is determined by the N.A. of optical fibers 710. N.A. stands for Numerical Aperture. It means that in air, N.A. is equal to n sin θ (n stands for the refractive index of the exit medium and θ stands for the incidnet angle). Further, in view of light propagation through step index-type optical fibers (plastic fibers belong thereto), N.A. is represented by the formula:

$$N.A. = \sqrt{n^2_{core} - n^2_{clad}},$$

where n core stands for the refrective index of the core and n stands for the refrective index of the clad. In short, N.A. means a capacity for the extent of light. Therefore, N.A. for an ordinary plastic fibers is about 0.5 and the allowable angle θ which light enters the bundle of optical fibers is about −30° and 30°. When the direction of light entering optical fiber bundle 710 has a divergent angle greater than Θ, the level of cross talk from neighboring picture elements increases in proportion to the optical length between each picture element and the corresponding image input end (i.e., proximal end) of the optical fiber. When the optical path length exceeds a value defined by dividing the picture element length by tan Θ pieces of information associated with the picture element and its neighboring picture elements will be mixed together. The resolution of the image displayed on screen 110 will be degraded.

To reduce the cross talk at the area between the picture elements and image input end of optical fiber bundle 710, the thickness of transparent substrate 701 is made as thin as possible and preferably is set equal to or smaller than the picture element length. When a polarizer (not shown) is required to be interposed between transparent substrate 701 and optical fiber bundle 710, (e.g. when operating in a twisted nematic mode), the thickness of the polarizer is also made as thin as possible.

G picture elements generally include most of the luminance information. By disposing the G picture element in the center of the incident end of each optical fiber or by avoiding disposing the G picture element at the periphery of each fiber optical, cross talk between adjacent picture elements can be further minimized. A higher resolution of the image displayed by screen 110 results. The optical length between fiber bundle 710 and light shutter 700 is not more than a length (1) of RGB trio 706 (i.e., corresponding to the length of a picture element on the display surface) divided by the tangent of angle $\Theta$; the LCD having color filters as shown in Table 2.

Figure 8:
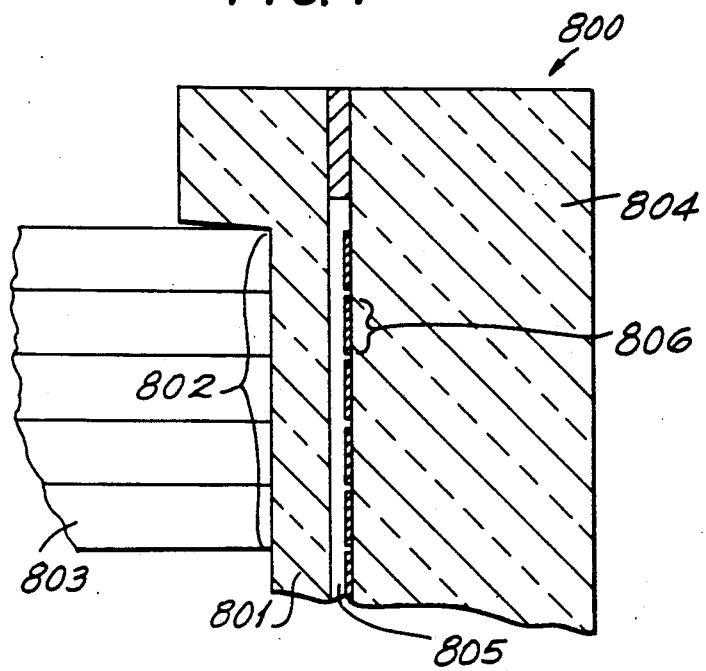
FIG. 8 is a sectional view of the junction between the light guide and light shutter in accordance with an alternative embodiment of the invention.

Other methods for reducing cross talk between adjacent picture elements can be used. For example, as shown in FIG. 8, cross talk also can be lowered by etching a transparent substrate 801 of an LCD 800 to conform to a junction 802 between LCD 80 and an optical fiber bundle 803. LCD 800 also includes an opposing transparent substrate 804 and a liquid crystal layer 805 which fills the gap between substrates 801 and 804. A plurality of electrodes 806 on transparent substrate 804 correspond to the plurality of picture elements. The thickness of transparent substrate 801 is less than the cross-sectional length of the optical fibers of bundle 803. A reduction in cross talk similar to the reduction in cross talk using a thin transparent substrate 701 is realized. The method of etching to reduce cross talk of FIG. 8 is preferred to the method of FIG. 7 which employs a thin transparent substrate 701 due to the superior structural strength of LCD 800 compared to light shutter 700.

Optical coupling of the light shutter to the optical fiber bundle necessitates accurate alignment therebetween to prevent light from being conducted when not desired. When the light shutter is slanted relative to the coupling end (i.e. image input end) of the optical fiber bundle (described below), a gap is created therebetween. This gap occurs even though the end faces of the optical fiber bundle and picture elements of the light shutter are planarly aligned with each other. An incomplete coupling between the light shutter and optical fiber bundle results. Accurate alignment between the light shutter and optical fiber bundle is aggravated due to this gap.

To effect accurate alignment when the end face of the light shutter is slanted, alignment marks are provided on the light shutter. For example, when a light& shutter employs color filters, alignment marks are formed using additional color filters. The additional color filters are laid on top of the original color filters to create a mismatch of colors. More particularly, an additional green color filter is laid on top of an original blue color filter or an additional red color filter is laid on top of an original blue color filter to form an alignment mark. Each of these alignment marks are approximately the same size as the size of a corresponding optical fiber. A black mask also can be used to prevent light leakage. Scattering or absorbing light by etching the surface of the light shutter or other suitable techniques also can be used to control the coupling of light at the junction between the light shutter and optical fiber bundle.

Alignment marks on the optical fiber bundle are provided as follows. Two or more fibers which are not required for image formation are bundled together with the other fibers of the bundle. The two or more extra fibers are disposed on a diagonal line. The optical fibers other than the extra optical fibers are coupled at the image input end of the bundle to the light shutter. In coupling the light shutter to the optical fiber bundle, a reference light is made incident to the end faces of the two or more extra fibers (i.e. which are not coupled to the light shutter). These extra optical fibers serve as lighting alignment marks on the optical fiber bundle side of the junction and correspond to the alignment marks on the light shutter in a one to one correspondence.

Effective alignment is achieved by detecting the reference light as it shines on the alignment marks of the optical fiber bundle and light shutter and passes through the LCD panel of the light shutter. Detection of the reference light can be facilitated by employing a photodetector. The photodetector should be sensitive to either light passing through the light shutter or light not passing through the light shutter.

The direction of coupling and the optical path of the reference light are the same. Alignment can be easily effected in regard to any direction of coupling of the light shutter and optical fibers. Alignment of the optical fiber bundle with the light shutter also can be achieved by making either the surface of the image input end of the optical fiber bundle or the light shutter concave and making the other surface of the image input end of the optical fiber bundle or the light shutter convex. Such shaping can be achieved by etching, application or thick film printing. Alignment is relatively simple and merely requires that in forming the concave and convex surfaces that the precise positions of where each optical fiber is to be coupled to a corresponding picture element be known when forming the concave and convex surfaces.

Figure 9:
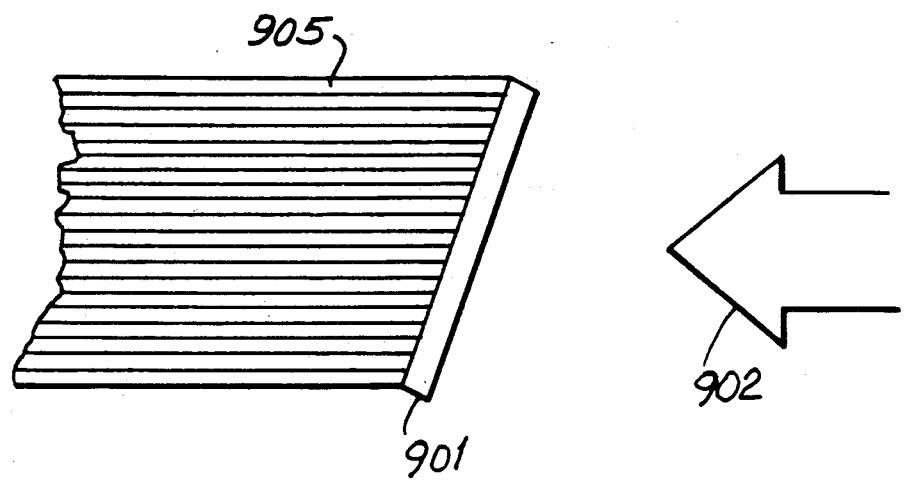
FIGS. 9(a) and 9(b) are diagrammatic elevational views of the light guide and light shutter coupled together in accordance with other alternative embodiments of the invention.
Figure 9:
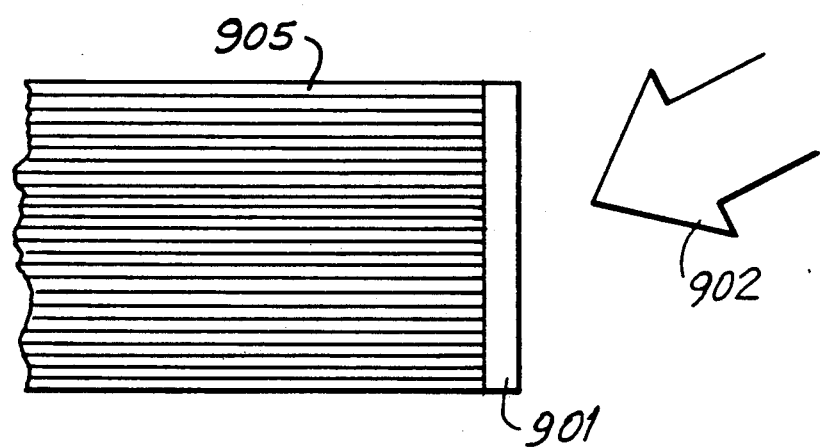

As shown in FIG. 9(a), an LCD 901 serving as a light shutter is coupled at an oblique angle to the image input end of an optical fiber bundle 905 so that an incident light 902 travels in substantially the same direction as optical fiber bundle 905 extends. As shown in FIG. 9(b), LCD 901 is coupled perpendicularly to the image input end of optical fiber bundle 905 with incident light traveling in an oblique direction to the direction in which optical fiber bundle 905 extends. In both FIGS. 9(a) and 9(b), incident light 902 strikes the surface of light shutter 901 at other than a right angle thereto.

The contrast in the image display by LCD 901 is dependent on the angle at which incident light 902 strikes LCD 901. Maximum contrast in the image occurs when incident light 902 strikes light shutter 901 at other than a right angle thereto. Therefore, by coupling light shutter 901 to optical fiber bundle 905 at other than a right angle thereto and/or directing the incident angle of light emitted from a light source (not shown) to strike light shutter 901 at other than a right angle thereto, maximum contrast in the image is achieved. Such maximum contrast occurs whether the light shutter operates in a twisted nematic (TN) mode, an electrically controlled birefringence mode, guest host mode or the like. By directing light from the light source to obliquely strike the surface of LCD 901, maximum contrast is provided in each of these modes.

When using a TN mode, an optical switching direction most suitable for the pre-tilt direction of the liquid crystal molecules should be used. Therefore, LCD 901 is coupled to optical fiber bundle 905 at a tilt so that light exits LCD 901 in a direction providing maximum contrast. In an ordinary TN mode, LCD 901 preferably has a tilt of about 0° to 30° relative to the central angle of the incident light. In this first embodiment of the invention, the incident angle is set within a range of about 0° to 30° based on the angle determined by N.A. and the aforementioned resolution.

Figure 10:
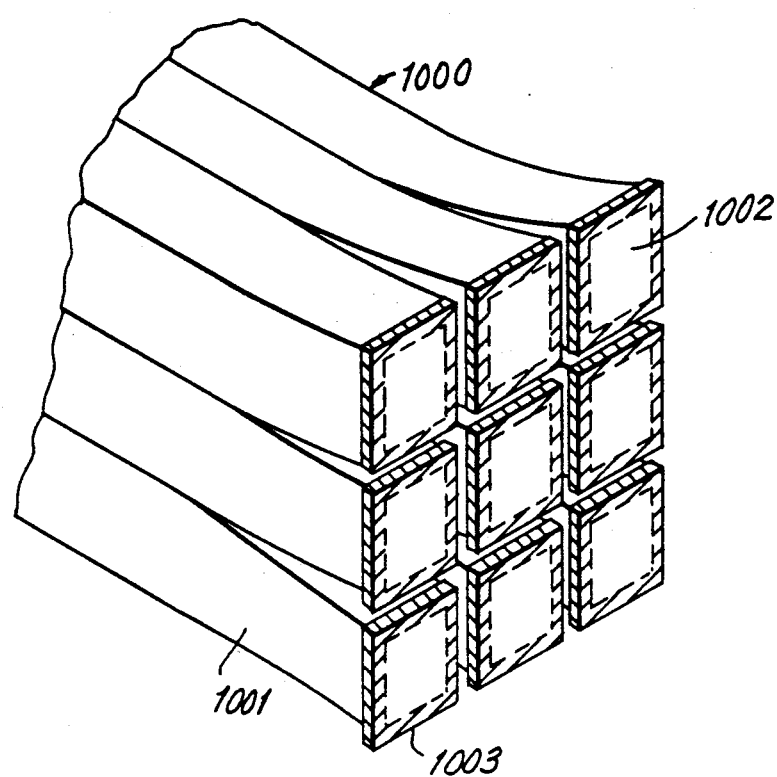
FIG. 10 is a fragmented perspective view of the light guide coupled to a light shutter in accordance with another alternative embodiment of the invention.

As shown in FIG. 10, an optical fiber unit 1000, which at its distal end forms a block on a screen similar to block 200 of FIG. 2, includes a plurality of optical fiber subunits 1001, each of which is coupled to a small sized LCD 1002. If each subunit 1001 were illuminated by a different light source, variations in the light intensities between the plurality of light sources would create an image having a non-uniform intensity of light. Accordingly, a single light source (not shown) illuminates the plurality of LCDs 1002 permitting the illumination of all subunits 1001 of optical fiber unit 1000 at the same time. Non-uniformity in the illumination of subunits 1001 is prevented. By providing a plurality of LCDs 1002 and corresponding plurality of subunits 1001 rather than a single LCD having a single image input end, the size of the light shutter can be reduced. Adequate space for mounting the light shutter in the light guide type display apparatus is more easily achieved. Each LCD 1002 is driven by a circuit board 1003 shown hatched. Since driving circuit boards 1003 are disposed in the spaces between subunits 1001, there is no adverse effect on the image displayed. At least about 500×500 picture elements are required to handle the display of a television picture. Each LCD 1002 has about 100×100 picture elements. Consequently, adequate spacing is available for installing control circuitry.

Figure 11:
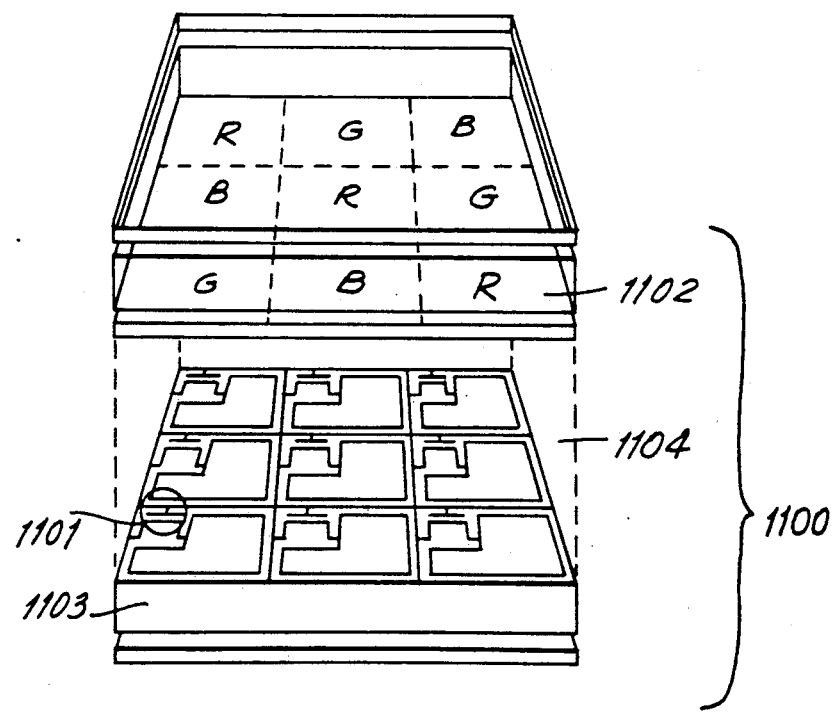
FIG. 11 is an exploded perspective view of the light shutter of FIG. 10.

FIG. 11 is a sectional view of an LCD 1100 used as a light shutter. LCD 1100 includes a color filter layer 1102 disposed between two transparent substrates 1103, each of which has electrodes thereon. A liquid crystal material 1104 fills the space between transparent substrates 1103. An active matrix type LCD as specified in Table 2 (shown below) uses a plurality of thin film transistors (TFT) 1101 as active elements. The thin film transistor LCD will hereinafter referred to as a TFT-LCD. The method of driving TFT-LCD 1100 and the construction of TFT-LCD 1100 are based on the TFT-LCD's disclosed in "Nikkei Electronics" No. 351 (1984), p 211–240; SID '83 Digest, p. 156 (1983), and SID '85 Digest, p. 278 (1985).

TABLE 2

| Display mode | TN mode |
|---|---|
| Driving method | TFT active matrix |
| Number of pixels | 480 × 440 |
| Effective display area | 96 × 88 mm |
| Color filter | RGB dichroic filter |

FIG. 12 illustrates a simple driving method when a plurality of LCDs 1203 are used as a light shutter. An X-scanning circuit 1201 is used for driving LCDs 1203 in the X direction and a Y-scanning circuit 1202 is used for driving LCDs 1203 in the Y direction so that the plurality of LCDs 1203 operate as though they were a single LCD.

As shown in FIG. 13, a plurality of X-scanning circuits 1303 and a plurality of Y-scanning circuits 1304 are associated with a corresponding plurality of LCDs 1310. Interconnections to each LCD 1310 are reduced to only two, that is, an interconnection to a display data line 1301 and a connection to a timing signal line 1302. The number of interconnections required between LCDs 1310 and the external circuitry is reduced as compared to the circuitry of FIG. 12. Each LCD 1310 stores data for one line corresponding to a display region on the screen. Selection of Y-lines is carried out in parallel. LCDs 1310 can be set so that the duty ratio per picture element of each LCD 1310 is not increased. Lowering in the multiplexing characteristics is thereby avoided.

Any type of LCD can be used a the light shutter provided that the LCD is able to form an image as a matrix pattern. In this first embodiment of the invention, TFT-LCDs are employed.

Figure 14:
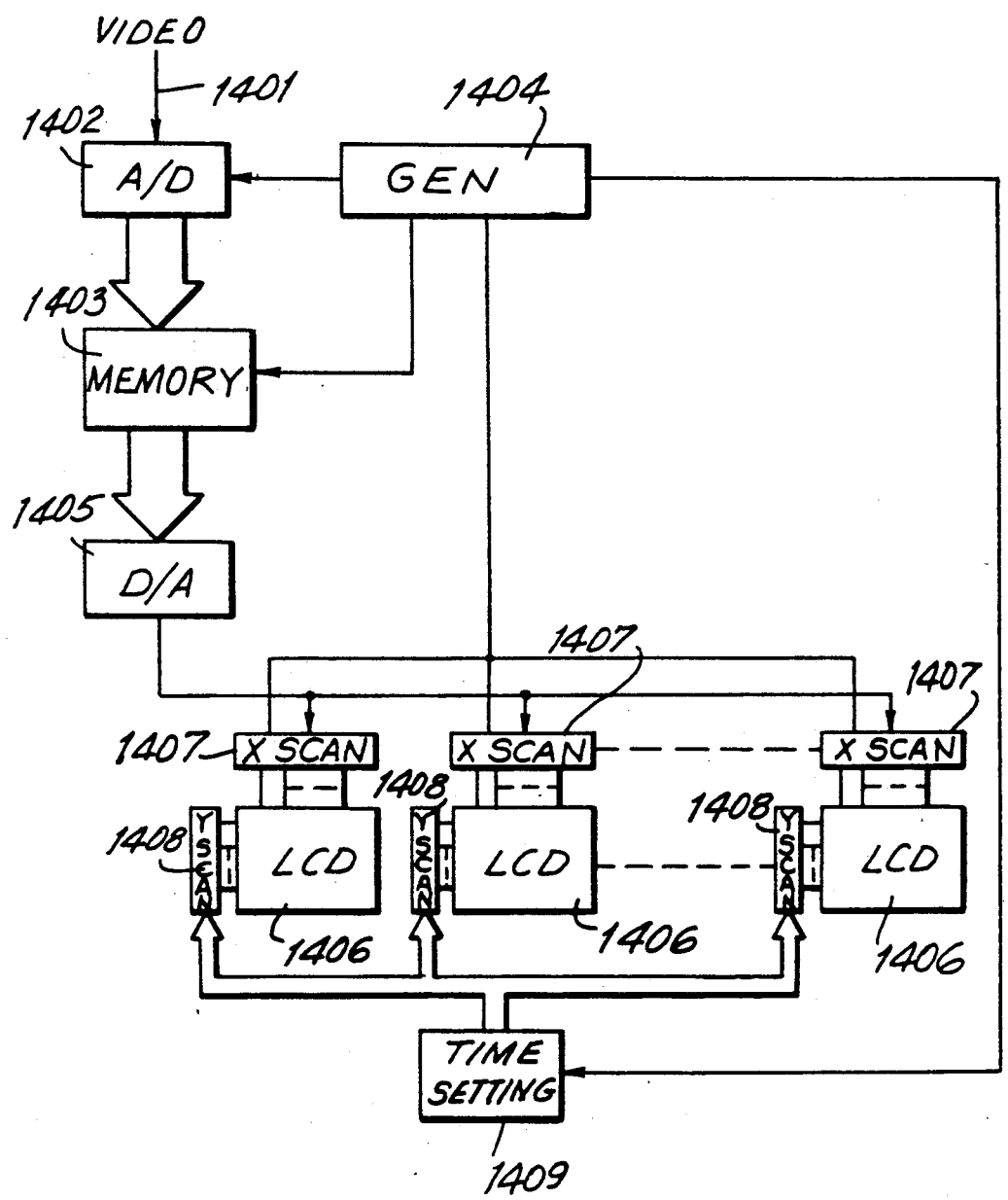
FIG. 14 is a block diagram of another alternative driving circuit of FIG. 10.

FIG. 14 is a block diagram of a driving circuit for a plurality of TFT-LCDs. A video signal 1401 is converted into digital data by an analog to digital (A/D) converter 1402 and stored in a frame memory 1403. A timing generator 1404 generates an output timing signal to A/D converter 1402, frame memory 1403 and a plurality of X-scanning circuits 1407. Display data, which is outputed from frame memory 1403, is converted back to analog data by a digital to analog (D/A) converter 1405. The analog display data is transferred to each of a plurality of TFT-LCDs 1406 in response to a select timing signal provided by timing generator 1404. Each TFT-LCDs 1406 is connected to one of a plurality of X-scanning circuits 1407. Each scanning circuit 1407 has an analog data latch which latches data for one line corresponding to a display region. The latched data is transferred to a selected Y-line (not shown) in response to a Y-timing signal. Each of the plurality of TFT-LCDs 1406 is connected to one of a plurality of Y-scanning circuits 1408 which provide the Y-timing signals. The Y-lines of the TFT-LCDs 1406 can be selected either sequentially or in parallel. Selection of the Y-lines in parallel is considered preferable since it is possible to obtain a relatively long period of time during which each Y-line is in a select state which permits the number of interconnections to the plurality of TFT-LCDs 1406 to be reduced. Time setting signals are provided to each Y-scanning circuit 1408 by a time setting circuit 1409.

Figure 15:
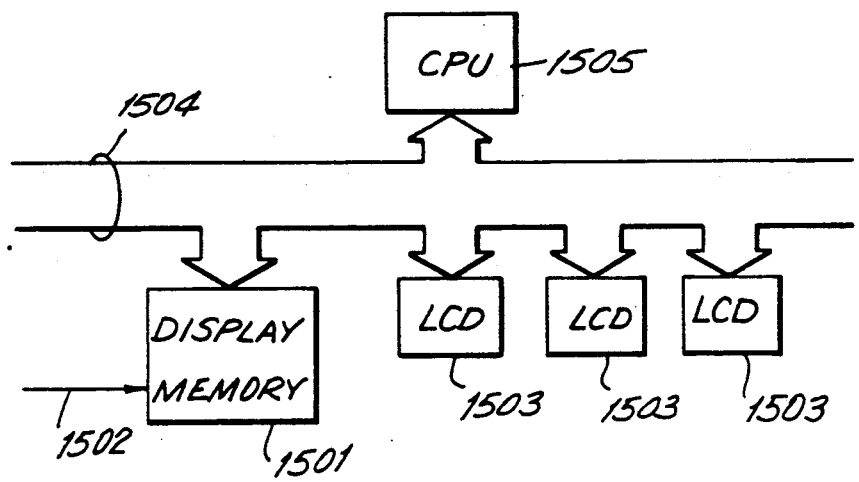
FIG. 15 is a block diagram illustrating the path of display data provided to a plurality of LCDs connected in parallel.

As shown in FIG. 15, a display data signal 1502 is provided to a plurality of LCDs 1503 in parallel. Display data 1502 is serially transmitted and temporarily stored in a display memory 1501. The stored display data is read out of display memory 1501 in parallel in accordance with the stored data position on a screen (not shown). Each LCD 1503 displays a particular piece of information to be used in forming the overall image on the screen, that is, each LCD 1503 is associated with a particular piece of information stored in display memory 1501. A central processing unit (CPU) 1505 controls when the stored data read out of display memory 1501 is sent along a data bus 1504 and into which of the plurality of LCDs 1503 the data is to be written based on the association of each LCD with the overall image to be displayed on the screen.

Figure 16:
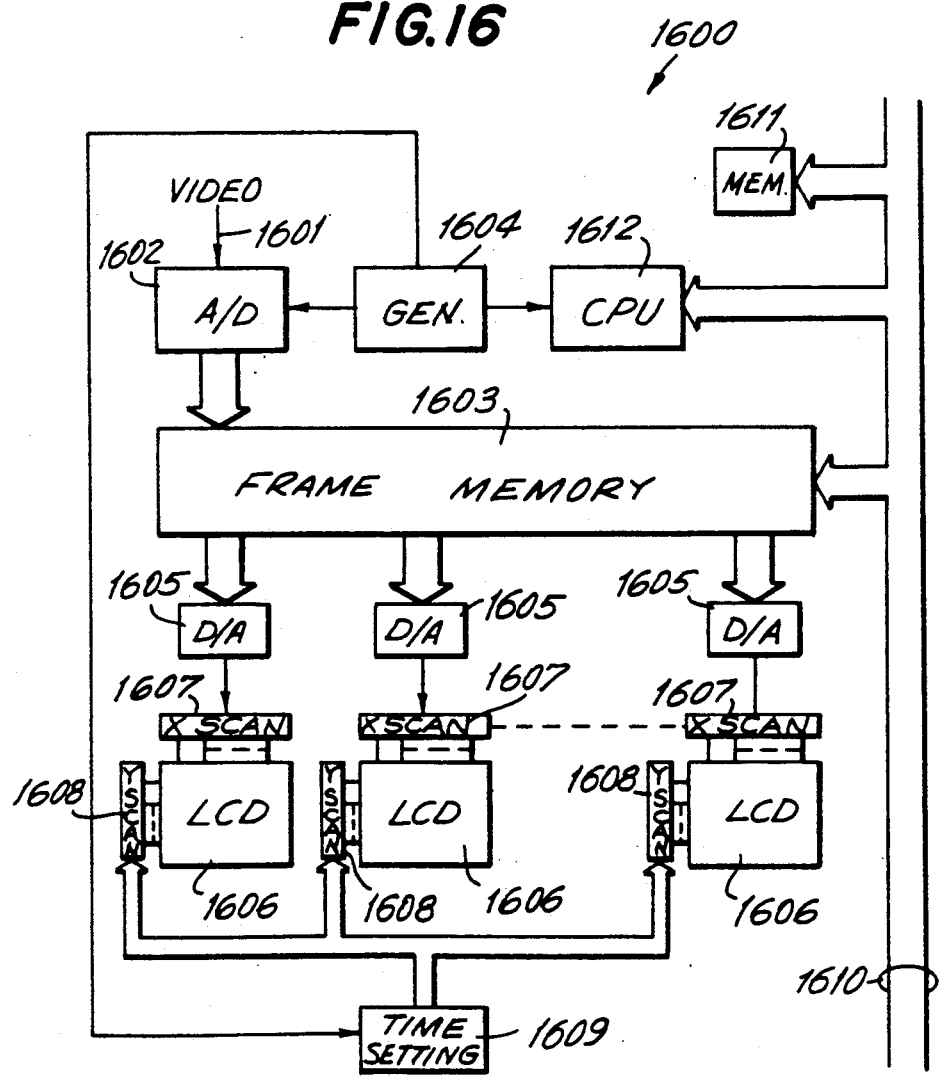
FIG. 16 is a block diagram of yet another alternative driving circuit of FIG. 10.

FIG. 16 is a circuit block diagram 1600 for affecting parallel transmission of data to a matrix of TFT-LCDs 1606. A video signal 1601 is converted into digital data in an A/D converter 1602 and stored in a frame memory 1603. A timing generator 1604 provides timing signals to both A/D 1602 and a CPU 1612. Display data outputed from frame memory 1603 is converted back to analog data by a plurality of D/A converters 1605. The analog data is then transferred to one of the plurality of TFT-LCDs 1606. Addresses in frame memory 1603 used at the time of reading out the data from frame memory 1603 are determined based on a program stored in a memory 1611. CPU 1612, which preferably is a microcomputer, controls the display image memory (frame memory 1603) and program memory 1611. Signals transmitted for controlling from memory 1603 and program memory 1611 are transmitted on an address bus 1610.

Each TFT-LCD 1606 is connected to one of a plurality of X-scanning circuits 1607 which latch analog data corresponding to one line in a display region on a screen. The latch data is transferred to a selected Y-line in response to a Y-timing signal. Transfer of such latched data for each selected Y-line is controlled by one of a plurality of Y-scanning circuits 1608. The Y-lines in a plurality of TFT-LCDs 1606 can be selected either sequentially or in parallel. Selection in parallel is preferred since a relatively long period of time exists during which each Y-line is in a select state permitting a reduction in the number of interconnections to the TFT-LCDs 1606. A Y time setting circuit 1609 is connected to each Y-scanning circuit 1608 to provide select timing signals thereto.

Advantageously, circuit block diagram 1600 reduces the number of interconnections to the plurality of TFT-LCDs 1606. It is also possible to raise the operating duty of the plurality of TFT-LCDs 1606 so that the select time per picture element is lengthened. The aspect ratio of the light shutter (i.e. TFT-LCDs 1606) can be determined independently of the aspect ratio of the displayed image. Consequently, the light shutter can be driven at an operating duty at which excellent electro-optic characteristics of TFT-LCDs 1606 can be obtained.

Figure 17:
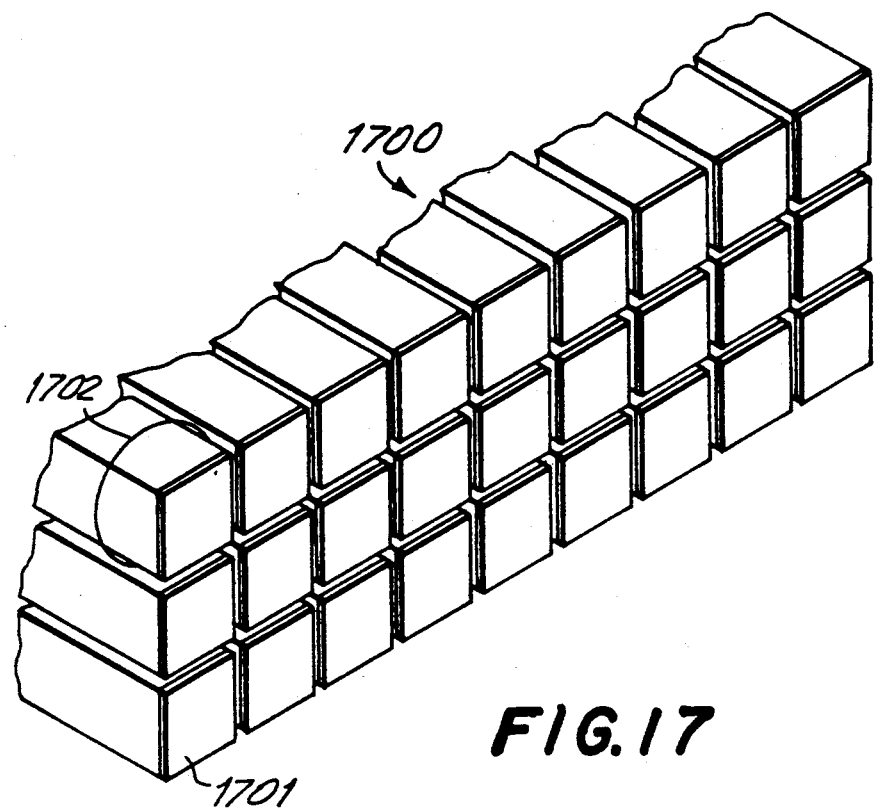
FIG. 17 is a fragmented perspective view of a junction between the light guide and light shutter in accordance with another alternative embodiment of the invention.

FIG. 17 is a perspective view of the junction between a plurality of TFT-LCDs 1701 which form the light shutter and a light guide 1700 which can be used in connection with the driving method of FIG. 16. An NTSC television signal for 540×540 trios of picture elements R, G and B is formed using 27 TFT-LCDs 1701. Each TFT-LCD 1701 controls 180×60 trios (i.e. 180×180) of picture elements R, G and B. Light guide 1700 includes 27 optical fiber bundles 1702. Each optical fiber bundle 1702 is coupled to one TFT-LCDs 1701.

Figure 18:
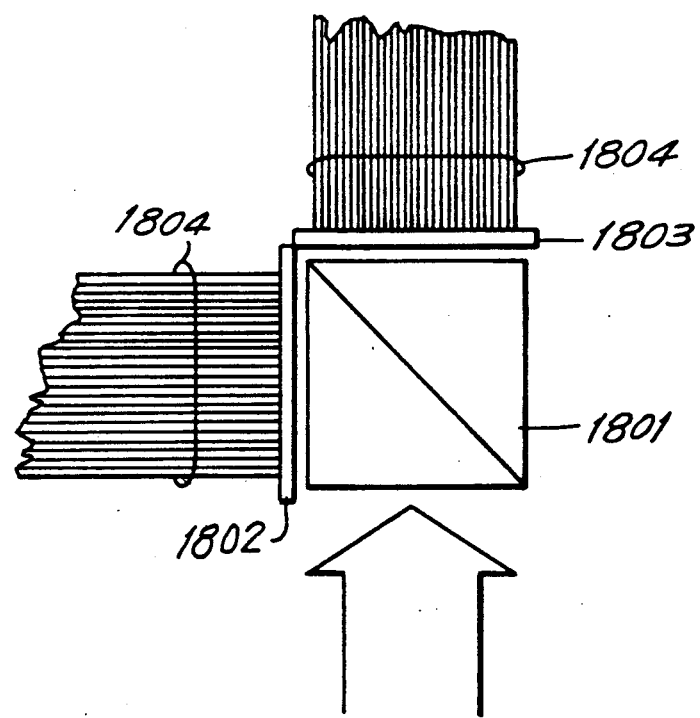
FIG. 18 is a plan view of the junction between the light shutter and a light source.

FIG. 18 illustrates the junction between a light shutter and a portion of a light source. Generally, a polarizer is used to limit the plane of polarization of light entering and leaving a liquid crystal panel serving as the light source. The light source includes a polarization beam splitter 1801 which limits polarization of incident light into two different planes (e.g., perpendicular to each other). A pair of liquid crystal panels 1802 and 1803 having no upper polarizing plates each receive a light beam leaving polarization beam splitter 1801 Each of these beams propagates in only one polarized plane. Liquid crystal panels 1802 and 1803 together form the light shutter. A pair of optical fiber bundles 1804 are coupled to liquid crystal panels 1802 and 1803.

Conventional liquid crystal displays which provide for polarized light produce light beams propagating in only one plane, that is, discarding through absorption by the polarizer light propagating in directions other than the direction of the polarizing axis. By using the polarized light components from two different planes, light is more effectively and efficiently used permitting a light source to operate at approximately one half the power output required by conventional liquid crystal displays. A reduction in the overall size of the apparatus and lower rate of power consumption results. Further, the load applied to the cooling device for cooling the heated polarizer due to light being absorbed by the polarizer is reduced. Restrictions in the overall size of the apparatus to prevent overheating and to accommodate a large-sized cooling device are eliminated. A smaller sized apparatus with lower power consumption results.

Figure 19:
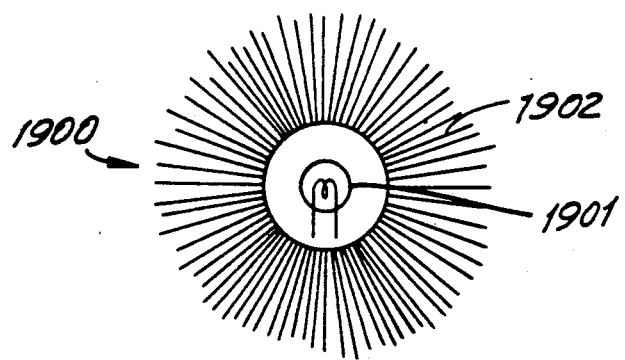
FIG. 19 is a sectional view of a light source.

FIG. 19 is a sectional view of a fiber type light source 1900. Light source 1900 includes a light generator 1901. A halogen lamp, a cold-cathode tube, a fluorescent lamp or the like serves as light source generator 1901. Light source 1900 also includes a plurality of optical fibers 1902, which surround light generator 1901 and are in close contact with each other. Light emitted from light generator 1901 is substantially fully coupled to optical fibers 1902. Each optical fiber 1902 has a distal end 1903 which is optically coupled to the light shutter (i.e., the image forming device). Fiber-type light source 1900 can be used as light source 105 of FIG. 1. Advantageously, optical fibers 1902 permit the direction in which light is optically coupled to the light shutter to be changed as desired.

Suitable materials for optical fibers 1902 include quartz glass fibers or the like. Such materials withstand relatively high levels of calorific power. Of particular importance are the heat resistance characteristics of the optical fiber material. Other suitable materials for optical fibers 1902 include, but are not limited to, plastic optical fibers which can sustain only relatively low levels of calorific power. Plastic optical fibers, however, are far less costly and much lighter in weight than quartz glass fibers or the like.

As compared to the combination of reflecting mirrors and a condenser lens or optical fibers employed in prior art light guide type display apparatuses, fiber-type light source 1900 is much simpler to produce since it has a far less complicated optical design and requires no high precision alignments between the light shutter and light source. Fiber-type light source 1900 also provides a high quality and uniform illumination which is optically coupled to the light shutter. Focusing problems associated with conventional optical systems and, in particular, the need to lower the number of marginal, unfocused rays and costs associated therewith are eliminated by fiber-type light source 1900.

Preferably, each optical fiber 1902 has a diameter which is smaller than the size of each picture element on the surface of the light shutter panel. More than one optical fiber 1902 is arranged to correspond to each picture element. Therefore, fiber-type light source 1900 need not be specially aligned with the light shutter and minimizes any differences in the level of light between the picture elements. Light generator 1901 is not a perfect light source (i.e., a pin source) but rather radiates a non-uniform level of light depending on the relative position of optical fibers 1902 relative to light generator 1901. By irregularly spacing optical fibers 1902 about light generator 1901 such non-uniformity can be reduced.

Light radiated from fiber-type light source 1900 is far superior in uniformity compared to conventional light sources used in prior art light guide type display apparatuses. There is substantially no difference in the level of luminance between the light guide display elements (i.e. the plurality of optical fibers 1902 associated with each picture element). Light which has heretofore been unused and therefore wasted in the form of heat by prior art light guide type display apparatuses is now optically coupled to the light shutter by the invention. In particular, the level of luminance is improved by 30% or more for the same light generator (i.e., lamp). Such improvement permits a lamp of smaller size to be used in the light guide type display apparatus while maintaining the same level of luminance provided by a larger sized lamp found in prior art light guide type display apparatuses. By using a smaller sized lamp, a reduction in the amount of heat generated by light generator 1901 results. Power consumption of the apparatus is lowered. Therefore, the size of the power source and cooling device and overall size of the light guide type display apparatus is reduced. The same level of luminance output as provided in larger sized lamps used in conventional light guide display apparatuses is nevertheless maintained. The foregoing constructions with respect to embodiment 1 result in a light guide type display apparatus in which boundaries (lines) on display screen 110 are slightly perceptible, if at all, and provides a uniform and high quality display.

Embodiment 2

Figure 20:
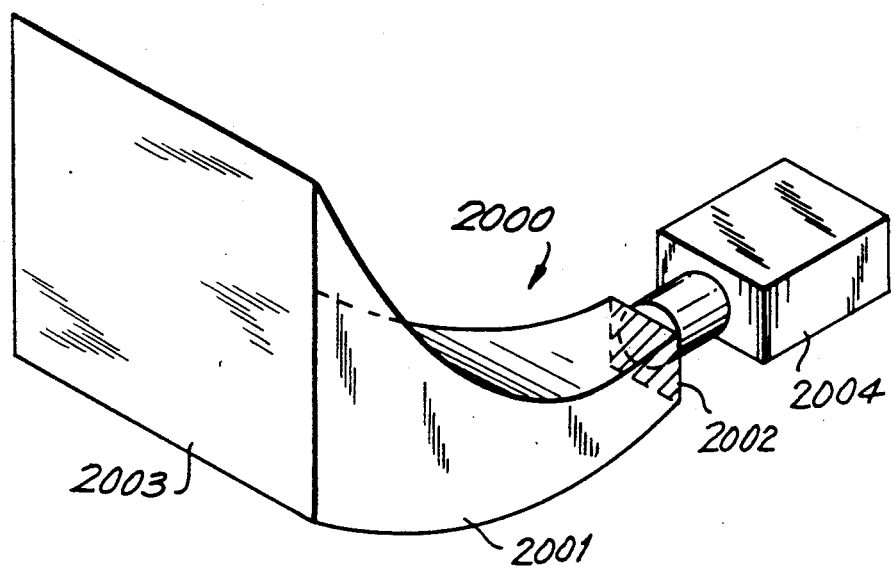
FIG. 20 is a diagrammatic perspective view of a light guide type display apparatus in accordance with a second embodiment of the invention.

FIG. 20 illustrates a light guide type display apparatus 2000 in accordance with a second embodiment of the invention. Apparatus 2000 includes an optical fiber bundle 2001 for magnifying the image to be displayed at an exit end 2003 of bundle 2001. An image input end 2002 (shown hatched) of bundle 2001 receives the image formed by a liquid crystal projector 2004. In contrast to Embodiment 1, the image is provided to image input end 2002 using an image forming optical system rather than one or more LCDs.

Figure 21:
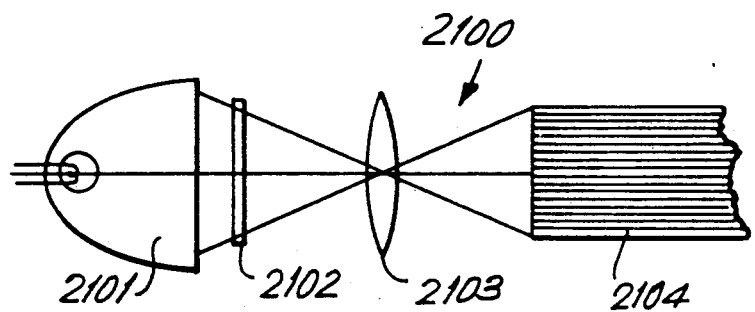
FIG. 21 is a diagrammatic elevational view of a liquid crystal projector of FIG. 20.

As shown in FIG. 21 a liquid crystal projector 2100 includes a light source 2101, LCDs 2102, a projecting optical system 2103 and an optical fiber bundle 2104. The image produced by LCDs 2102 is projected by system 2103 towards optical fiber bundle 2104. Examples of projectors similar to projector 2100 include (1) projectors which employ a rear projection type optical shutter as disclosed in Appl. Phys. Lett. Vol. 21392 (1972), (2) projectors which include a reflex light shutter as disclosed in Japanese Patent Laid-Open No. 56-43681 (1981) which corresponds to U.S. Pat. No. 4,378,955, (3) projectors which include optical writing light shutters as disclosed in Television Society Technical Report OPT-216 (January, 1986), and (4) projectors which include a matrix light shutter as disclosed in Japanese Patent Laid-Open No. 61-99118 (1986) which corresponds to U.S. Pat. No. 4,850,685. U.S. Pat. Nos. 4,378,955 and 4,850,685 are incorporated herein by reference thereto. Any of these four types of projectors can be used as projector 2100.

Figure 22:
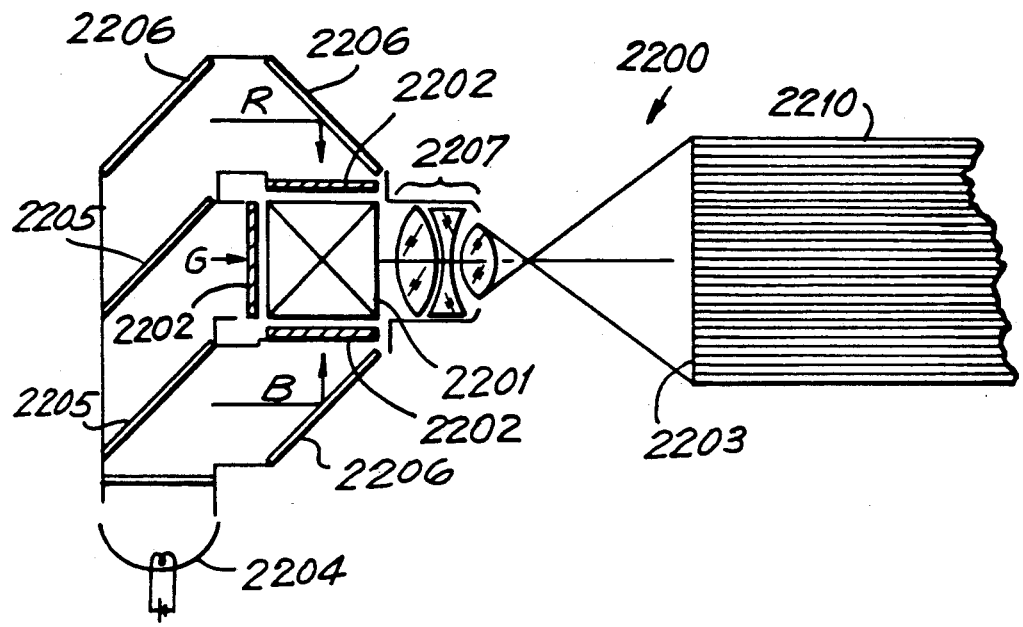
FIG. 22 is a plan view of the liquid crystal projector.

FIG. 22 illustrates a color projector 2200. Color projector 2200 mixes the three primary colors together using a dichroic element 2201. As compared to a color filter, projector 2200 utilizes light far more efficiently resulting in a brighter display. Color projector 2200 operates as follows: A light source 2204 radiates light which is segregated into its primary colors of green (G), blue (B) and red (R) by spectroscopic dichroic mirrors 2205. A plurality of mirrors 2206 and spectroscopic dichroic mirrors 2205 direct primary colors R, G and B towards a matrix of TFT-LCDs 2202. The three primary color images produced by TFT-LCDs 2202 are mixed together by dichroic element 2201 and thereafter are directed toward a projecting optical system 2207. The colored image is then projected by system 2207 on an image input end (i.e, incident face) 2203 of an optical fiber bundle 2210. Since the three primary colors G, B and R strike incident face 2203 at substantially the same time (i.e. all together) the number of optical fibers in bundle 2210 can be reduced permitting a reduction in the overall length of the optical fibers within bundle 2210.

The light guide (i.e. optical fiber bundle 2210) is similar to light guide 103 of Embodiment 1. An accurate image can be formed even when a simple stack type light guide is used by employing projector 2200. Projector 2200 serves as a light shutter which is optically coupled by optical fiber bundle 2210 to a display screen. As compared to a conventional light guide type display apparatus, apparatus 2000 provides a brighter image having a higher resolution and overall superior quality. Furthermore, the length of the optical fiber bundle is reduced compared to the optical fiber bundles of a conventional light guide type display apparatus.

Embodiment 3

Optical fibers coupling the light shutter to the display screen in Embodiment 1 or Embodiment 2 shift each of the optical fibers with respect to each other by a predetermined amount. In accordance with the third embodiment of the invention, the optical fibers are even more randomly shifted (i.e., interlaced) with each other than as disclosed in either Embodiment 1 or Embodiment 2.

Figure 23:
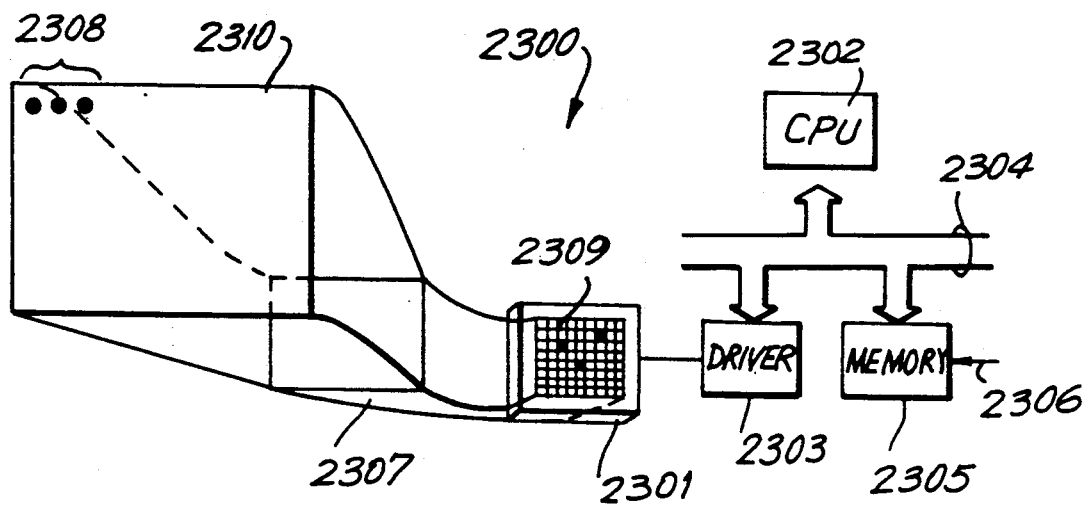
FIG. 23 is a perspective view and block diagram of a light guide type display apparatus in accordance with a third embodiment of the invention.

As shown in FIG. 23, a light guide type display apparatus 2300 includes an LCD 2301 for forming an image which is coupled through an optical inverse transformation matrix element 2307 to an exit face 2310 of element 2307 which serves as a display screen. A CPU 2302 scrambles the information to be displayed by LCD 2309. LCD 2309 is driven by a driving circuit 2303. Serial data 2306 is written into a memory 2305. A data bus 2309 carries instructions and information between CPU 2302, driver 2303 and memory 2305.

A specific scramble circuit (not shown) is designed to access a two port memory having a random port according to a transposed matrix defined by an optical inverse transformation matrix. Addresses used during the transformation are based on an order of serial data previously programmed into memory 2305 which in turn are based on the measured characteristics of the optical inverse transformation matrix. The optical inverse transformation matrix is arranged by interlacing optical fibers at random. Consequently, a plurality of picture elements 2308 which are adjacent to each other on the display screen can be discretely disposed on an image input end (i.e., incident face) 2309 of element 2307. In other words, optical inverse transformation matrix element 2307 restores the image to its prior form (i.e. prior to the optical inverse transformation).

By making use of the characteristics of matrix LCD 2301 the optical fibers of elements 2307 can be arranged to suppress the generation of boundaries (i.e. lines) on the display screen. The degree of suppression is based on the particular transformation used. Suppression in the unevenness of the light intensity displayed on screen 2310 is based on the intensity distribution of the light generator within the light source.

Embodiment 4

Figure 24:
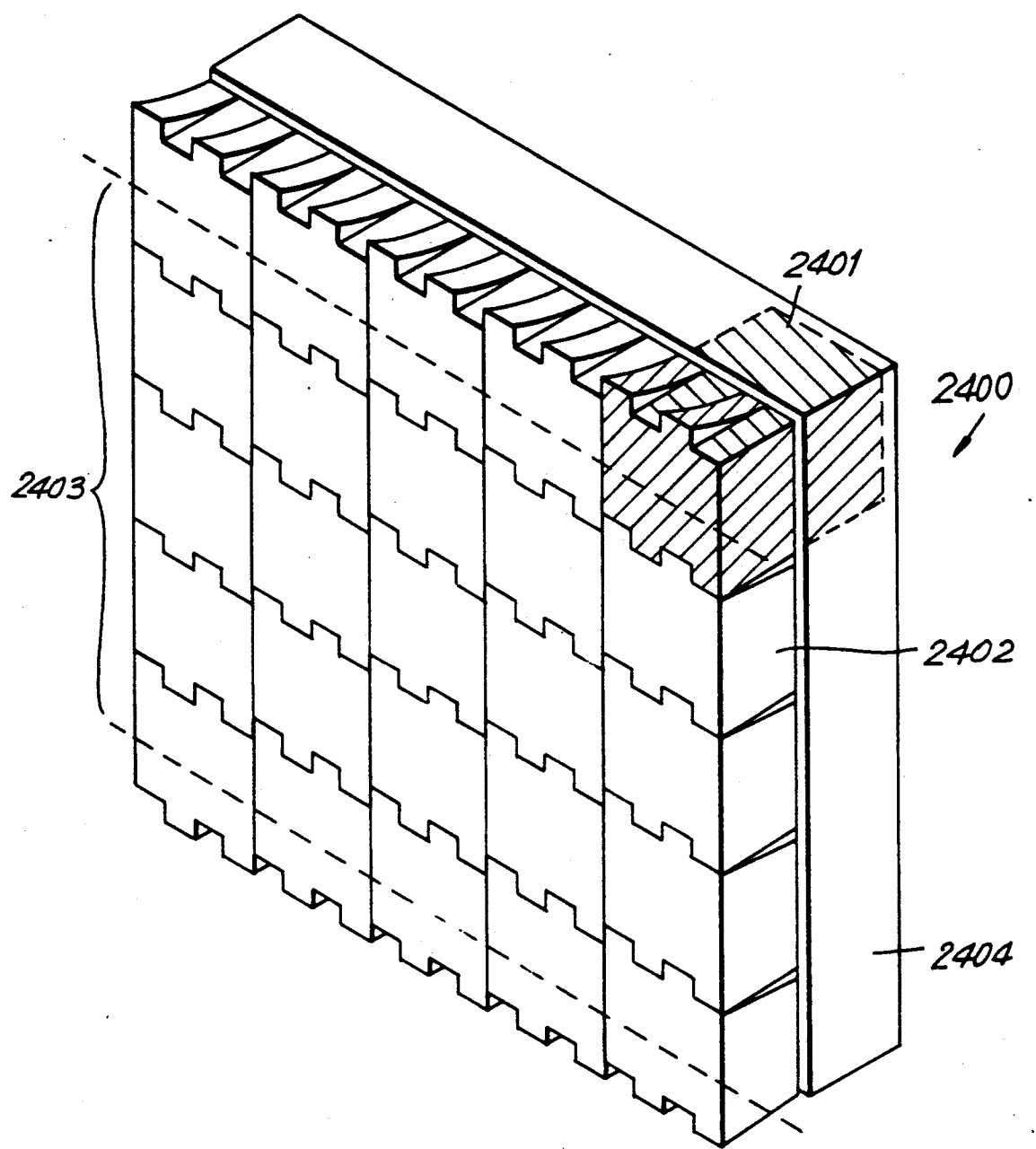
FIG. 24 is a perspective view of a light guide type display apparatus in accordance with a fourth embodiment of the invention.

FIG. 24 illustrates a light guide type display apparatus 2400 in accordance with a fourth embodiment of the invention. A plurality of units 2401 (shown hatched) form a display screen and are interlaced with each other at an image output end 2402 of a light guide. Image output end 2402 of the light guide serves as a display screen. A unit support member 2404 accommodates each unit 2401 within an insertion space therein for support of the latter. A pair of dashed lines 2403 represent the upper and lower limits of the range within which units 2401 are used for display of an image. Those units 2401 outside of this range are masked.

Figure 25:
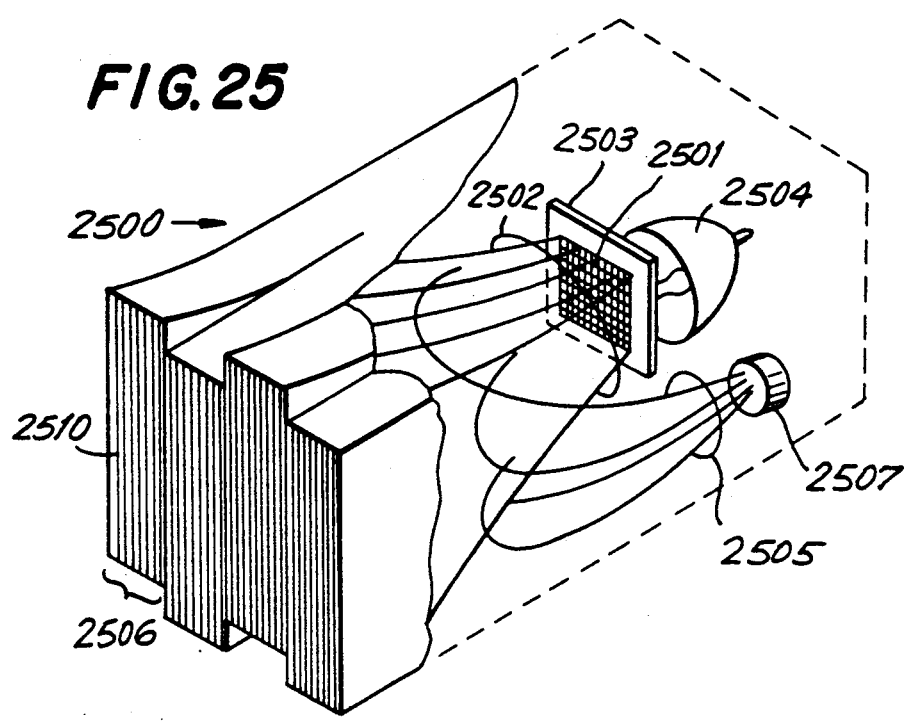
FIG. 25 is a perspective view, partially cutaway, of one unit from the light guide of FIG. 24 and an associated light shutter, light source and luminance detector.

FIG. 25 is a partially cut away perspective view of one of a plurality of units 2500 which form the display screen. Unit 2500 includes an optical fiber bundle 2502 having an image input end 2501 and an image output end 2510. A light shutter 2503 serves as the image forming device. An LCD is used as light shutter 2503. A light source 2504 directs light towards light shutter 2503. A plurality of optical fibers 2505 are coupled from several points on image output end 2510, which serves as a portion of the display screen, to a luminance detector 2507. Optical fibers 2505 carry light from the display screen to luminance detector 2507. A plurality of photodiodes serve as luminance detector 2507. To ensure a uniform level of luminance over the entire display screen, light source 2504 and LCD 2503 of each unit 2500 is adjusted based on the level of luminance detected by detectors 2507. More particularly, a new (i.e., set) level of luminance is fed back to light source 2504 and LCD 2503 to adjust the overall luminance level produced on the display screen. For purposes of simplification, the control and driving circuits for LCD 2503 in FIG. 25 have been omitted.

Figure 26:
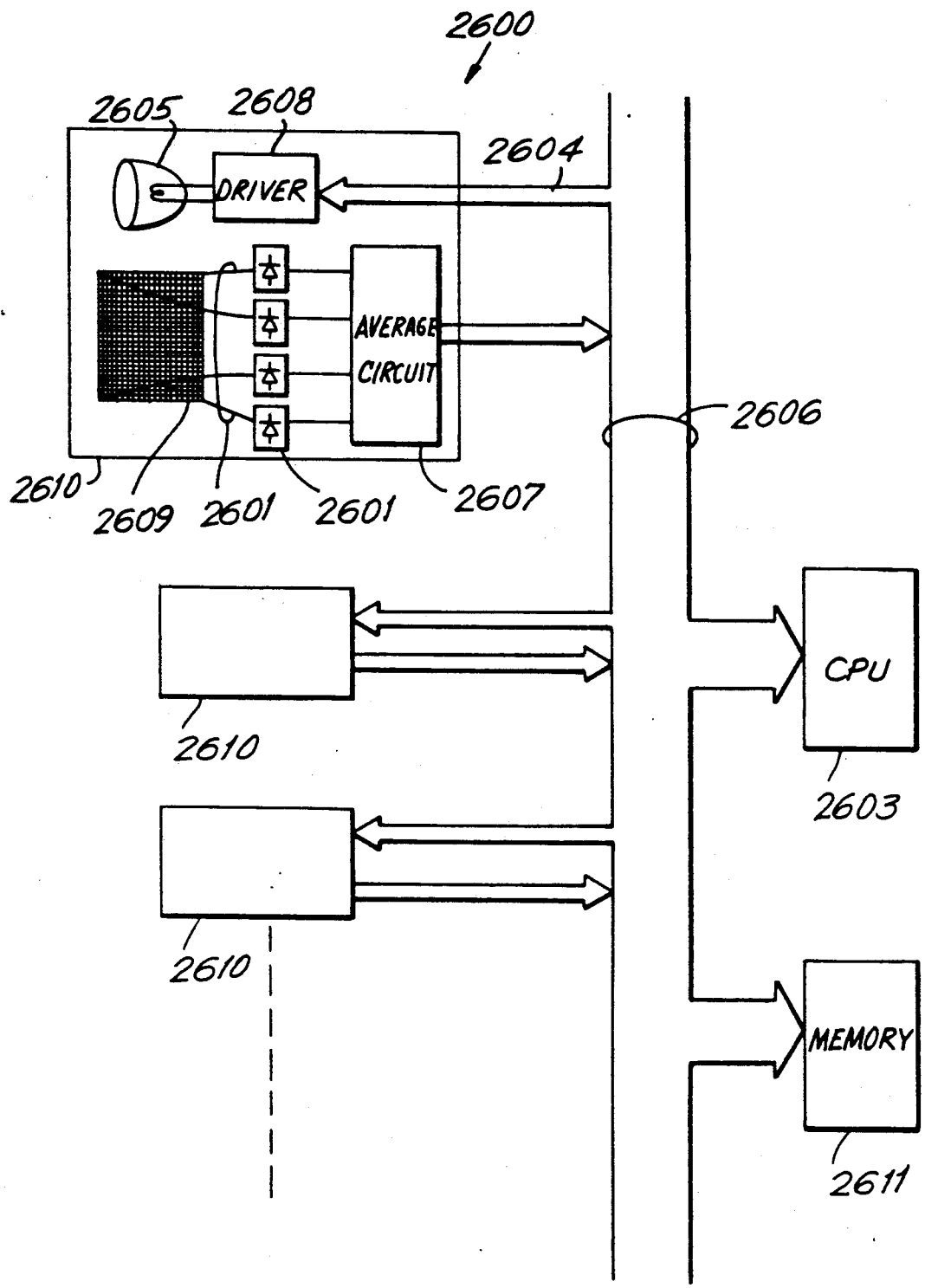
FIG. 26 is a block diagram of a luminance control circuit of FIG. 24.

FIG. 26 is a block diagram of a luminance control circuit 2600. A unit 2610 of circuit 2600 includes a light source 2605 which is driven by a driving circuit 2608. Light source 2605 serves as the image forming device. A luminance detector includes luminance detecting fibers 2601 (similar to optical fiber 2505) and a plurality of photodiodes 2602. A CPU (i.g., a microcomputer) 2603 arithmetically calculates the level of luminance displayed. The feedback path includes a control line 2604 which receives instructions from CPU 2603 carried by a bus 2606 to driving circuit 2608 regarding adjustments in the luminance level generated by light source 2605. A memory 2611 stores a control program used by a CPU 2603 for calculating the level of luminance produced on the display screen.

Signals produced by photodiodes 2602 which together represent the level of luminance detected over the entire display screen are inputed to an averaging circuit 2607 where they are averaged to obtain an average luminance data value in regard to unit 2500. The average luminance data value is outputed to bus 2606. CPU 2603 determines any adjustment, if any, required to be made based on this average luminance data in accordance with a program previously set in memory 2611.

The simplest method for calculating the adjustment to be made sets the level of luminance for the entire display screen to conform to the lowest level of luminance displayed on the screen by one of the plurality of units 2500. Once the adjustment to the other units 2500 has been determined, a luminance control signal is sent to light source driving circuit 2608 through feedback line 2604. This method involves changing the level of luminance by controlling the level of power applied to light source 2605. Correction in the level of luminance is achieved by monitoring the level of luminance on the display screen as occasion demands and controlling the level of brightness of light source 2605. Variations in the levels of luminance which are inherent within units 2500 can be corrected at the same time.

Other methods of adjusting the level of luminance to provide a substantially uniform level of luminance on a display screen are also possible. For instance the foregoing method controls the level of luminance produced by the image forming device by controlling the power applied to light source 2605. Luminance control also may be achieved by controlling the electro-optic characteristics of the light shutter or modifying the luminous intensity when a self-emission type light shutter is used. Alternatively, photodiode chips, which are installed directly on the display surface or image input end (i.e., incident surface) of the optical fiber bundle can be used eliminating the need for optical fibers 2505 or 2601. The number of luminous detectors 2507 or 2607 can be changed as desired. Luminance averaging circuit 2607 and the method of setting a new level of luminance for the entire display screen are not necessarily limited to those employed in this fourth embodiment. Other types of luminance averaging circuits and luminance setting methods also can be used provided that such luminance averaging circuits and methods of set ting for a new level of luminance function as described herein.

Referring once again to FIG. 25, the light guide (i.e., optical fiber bundle 2502) of unit 2500 includes a plurality of optical fiber sub-bundles 2506. Each sub-bundle 2506 is alternately shifted (i.e., interlaced) with respect to the next adjacent sub-bundle 2506 at its exit end. Each sub-bundle 2506 is formed by bundling 25 sheets of optic fibers; each sheet including 100 optic fibers. These exit ends of sub-bundles 2506 project outwardly from a casing (e.g. support member 2404) and are securely bonded together so as to form one rigid body. The incident ends of each sub-bundle 2506 together form image input end 2501 which is connected to the light shutter. No shifting takes place at the incident ends of sub-bundles 2506. Accordingly, image input end 2501 has a rectangular cross-section which faces the display surface of the light shutter (i.e, LCD 2503).

Pieces of information are supplied to image input end 2501 from the light shutter in an order reverse to the shift which occurs. The image displayed on the display screen presents a normal, unshifted image due to LCD 2503 including a matrix of picture elements which have been accurately positioned relative to each other.

Image input end 2501 can be formed by closely stacking the optical fibers next to each other. Each optical fiber has a substantially rectangular cross-sectional end and is designed so that one fiber corresponds to one trio of picture elements R, G and B of LCD 2503. Alternatively, each optical fiber can correspond to a multiplicity of picture elements R, G and B. In this alternative arrangement, a part of the information produced by LCD 2503 need not be coupled to the optical fiber while nevertheless providing a high quality displayed image. In other words, there is relatively little affect on the displayed image when a portion of the information produced by a multiplicity of picture elements is not fully coupled to one of the optical fibers. Unit 2500 is further defined by Table 3 as follows.

TABLE 3

| Fibers | plastic fibers outer diameter: 0.5 mm |
|---|---|
| Exit face | one-dimensional magnifying power with respect to incident face: 5:1 1/6 shift; RGB mixed transmission |
| Incident face | rectangularly compression-formed fiber |

TABLE 3-continued

| | bundle; rectangular cross-section |
|---|---|
| Number of pixels | 100 × 100 (units of trio of R, G and B) |
| Number of Fibers | 100 × 100 |
| Light shutter | matrix LCD |
| | 100 × 300 (units of picture element) |
| Light source | 250 w halogen lamp |
| Luminance control | feedback control between units |

Figure 27:
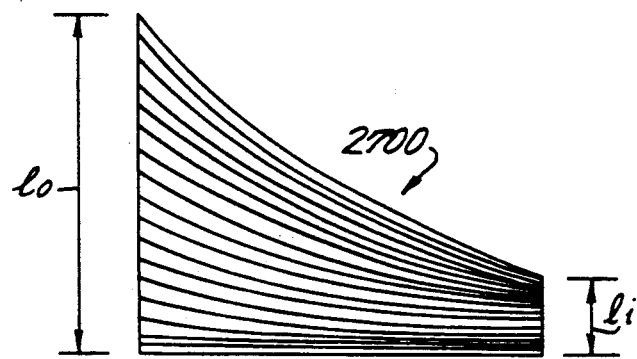
FIGS. 27(a) and 27(b) are sectional views of the optical fibers in accordance with alternative embodiments of FIG. 24.
Figure 27:
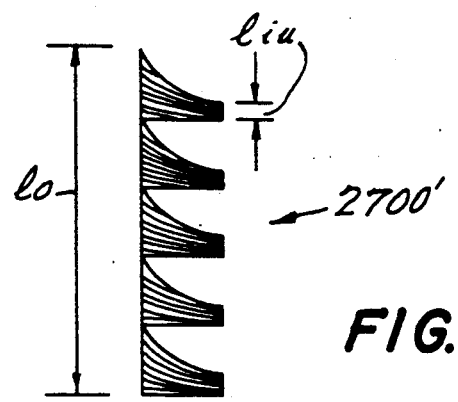

FIGS. 27(a) and 27(b) illustrate sectional views of a light guide formed by an optical fiber bundle when the entire display screen is constructed as a single unit and is divided into a plurality of units, respectively. As shown in FIG. 27(a), an optical fiber bundle 2700 has a length $l_o$ at its exit face and length $l_i$ at its incident face. The ratio of length $l_o$ to length $l_i$ is approximately 5:1. As shown in FIG. 27(b), optical fiber bundle 2700' is divided into five units 2703. The exit face of optical fiber bundle 2700' has a length $l_o$. Each of the exit faces of units 2703 has a length $1_{iu}$. The ratio of the length of the exit face to the incident face of optical fiber bundle 2700', that is, $l_o/5 \ 1_{iu}$ is also 5:1. Although the ratios of lengths at the exit face and incident face of optical fiber bundles 2700 and 2700' are the same, the optical fiber length of optical fiber bundle 2700' is approximately 1/5 that of optical fiber bundle 2700. In practice, the fiber length actually required can be reduced to about 1/20 rather than a 1/5 reduction since each of the units 2703 is reduced not only in the cross-sectional plane but also in a plane perpendicular to the cross-sectional plane of the drawing.

The reduction in fiber length produces not only a reduction in the overall cost of apparatus 2400 but also reduces the overall weight which is a significant problem as the size of apparatus 2400 increases. By unitizing the optical fiber bundle a reduction in the size of the LCDs can be achieved. For example, at least about 500×500 picture elements can be required to handle a television signal. Unitization of the optical fiber bundle permits use of small-sized LCDs each of which has about 100×100 picture elements so that low cost LCDs can be employed.

Preferably, TFT-LCDs are used in this fourth embodiment of the invention. The specifications of the TFT-LCDs are set forth in Table 4 as follows.

TABLE 4

| Display mode | TN mode |
|---|---|
| Driving method | TFT active matrix |
| Number of pixels | 100 × 300 |
| Effective display area | 80 × 80 mm |
| Color filter | RGB dichroic filter |

When a plurality of LCDs are used due to the unitization of the optical fiber bundle, the plurality of LCDs may be driven by any one of the following methods: (1) driving the plurality of LCDs as though they form a single LCD; (2) driving the plurality of LCDs wherein each LCD is provided with only interconnections for display data and for a timing signal; and (3) driving the plurality of LCDs so that display data is sent in parallel to the LCDs.

By using a plurality of LCDs in connection with the unitization of the optical fiber bundle, a reduction in the number of interconnections between units 2500 results. Input/output terminals of units 2500 can be connected to any interconnections of support member 2404 by simply inserting unit 2500 into support member 2404. Since the size of LCDs can be reduced, the LCDs can be driven at an operating duty which permits excellent electro-optic characteristics to be utilized. Furthermore, using a plurality of LCDs to form one light shutter allows the aspect ratio of the light shutter to be determined independently of the aspect ratio of the displayed image.

Figure 28:
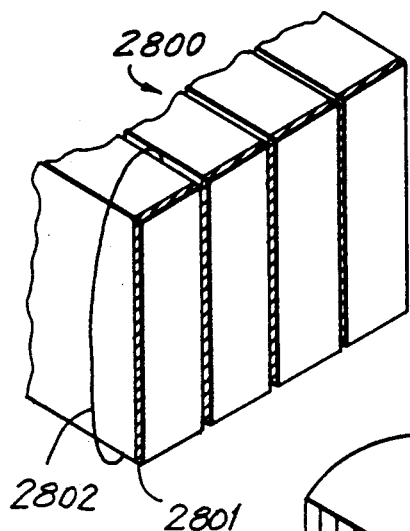
FIG. 28 is a fragmented perspective view of the juncture between the bundle of optical fibers and LCDs of FIG. 24.

FIG. 28 is a perspective view of a junction between an optic fiber bundle 2800, which forms one of a plurality of units of a light guide, with a light shutter, which includes four LCDs 2801. Each of the four LCDs 2801 has 100×75 picture elements, that is, all four LCDs 2801 together form a light shutter having 100×300 picture elements. Optical fiber bundle 2800 includes four optic fiber sub-bundles 2802, each sub-bundle 2802 corresponding to one LCD 2801.

Figure 29:
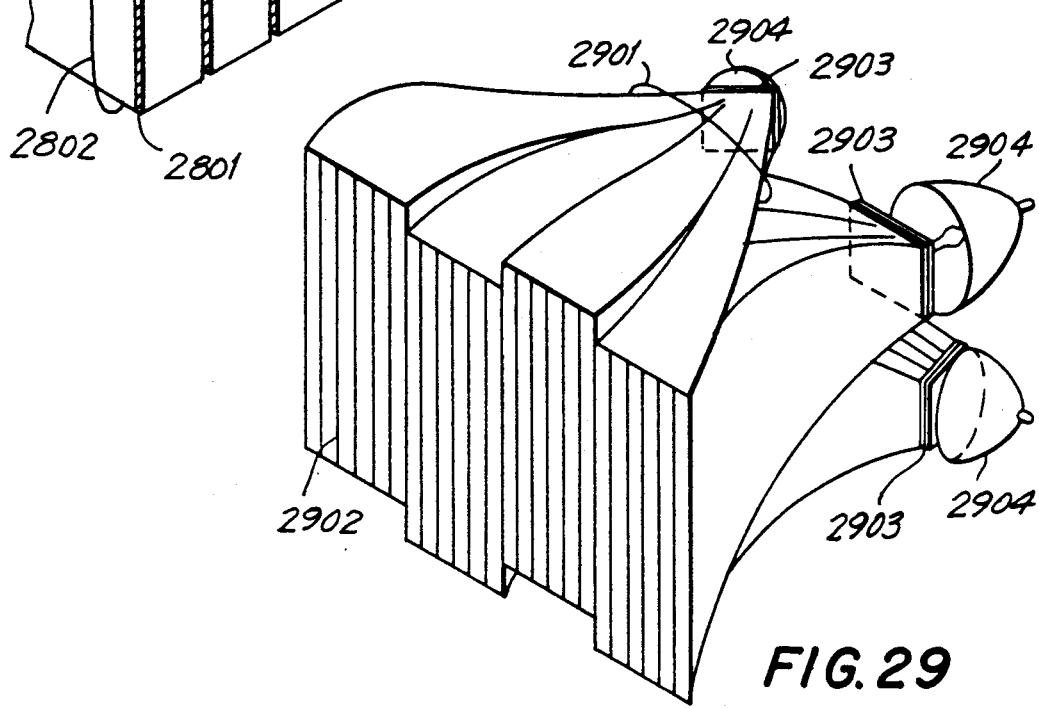
FIG. 29 is a perspective view of one unit of the display screen of FIG. 24 in accordance with an alternative embodiment of the invention.

As shown in FIG. 29, an optic fiber bundle 2901 having a display surface 2902 can be divided into three image input ends (i.e. incident faces) for receiving and mixing together the three primary colors R, G and B. More particularly, three light sources 2904 each produce a different primary color of light which is directed toward three LCDs 2903. Each of the LCDs, 2903 produce the same image, however, in a different one of the three primary colors R, G and B. Light sources 2904 can employ a polarization beam splitter light source or a fiber-type light source as discussed above in connection with Embodiment 1.

The unitized arrangement of optical fiber bundle 2901 provides a high quality light guide type display apparatus which permits the fiber length to be reduced, with boundaries (lines) produced on the display surface being only slightly perceptible with a substantially uniform level of luminance provided.

Embodiment 5

Figure 30:
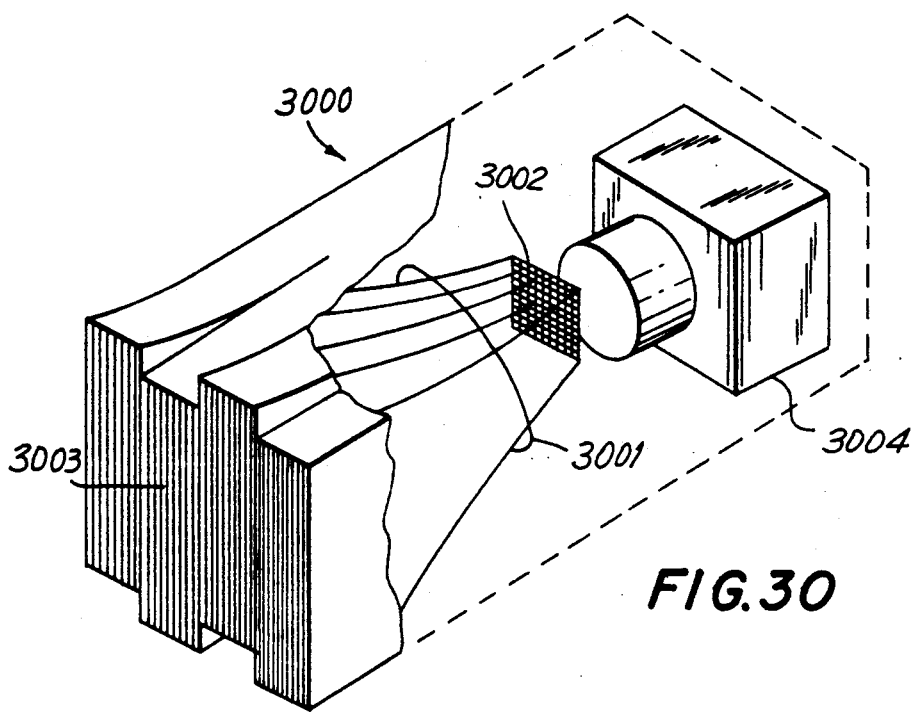
FIG. 30 is a perspective view, partially cutaway, of a light guide type display apparatus in accordance with a fifth embodiment of the invention.

FIG. 30 illustrates a unit 3000 of a light guide type display apparatus in accordance with a fifth embodiment of the invention. Unit 3000 includes an optic fiber bundle 3001 which serves as an enlarging optical system. Bundle 3001 has an image input end 3002 (shown hatched) and an image output end 3003 serving as a display surface. A liquid crystal projector 3004 serves as the image forming device. Apparatus 3000 differs from apparatus 2400 of Embodiment 4 in that no LCD is directly coupled to image input end 3002 but rather employs an image forming optical system through which an image is provided to image input end 3002.

The construction of liquid crystal projector 3004 is substantially similar to liquid crystal projector 2004 of Embodiment 2. Light guide 3001 is also substantially similar to the construction of light guide 2001 of Embodiment 2.

The invention is not necessarily limited to the five embodiments described heretofore. For example, a self-emission image forming device such as a cathode ray tube (CRT) can be used. The invention may be widely applied to a variety of light guide type display apparatus.

The invention substantially eliminates the boundaries between the blocks of optical fibers appearing on the display surface. These boundaries are only slightly perceptible and usually totally imperceptible. By effectively interlacing the optical fibers, which optically couple a light shutter to a display screen, the invention provides a light guide type display apparatus having a substantially uniform level of luminance and high quality display.

The invention reduces the amount of optical fibers required and thereby lowers the cost of the light guide type display apparatus. The size and weight of the apparatus also can be reduced by forming a display screen from a bundle of optical fibers which have been unitized. Production cost of the apparatus can be lowered since the elements of the apparatus can be standardized. The apparatus can be increased or reduced in size, as desired, by appropriately selecting the number of units forming the display screen. Servicing of the apparatus is facilitated since the apparatus is unitized.

The light source and light shutter employed by the invention are smaller in size than light sources and light shutters using conventional light guide type display apparatuses. The level of luminance between the units of the apparatus can be easily controlled. A light guide type display apparatus having a uniform level of luminance over the entire display screen and producing a high quality display results.

It will be thus be seen that the objects set forth above, among those made apparent from the preceding description are efficiently attained and, since certain changes may be made in carrying out the above method and in the above constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which, as a matter of language, might be said to fall therebetween.

What is claimed is:

1. A light guide type display apparatus, comprising:
   image forming means for forming an image;
   display means for displaying the image and including a plurality of individual display surfaces; and
   optical fiber means for supplying and shifting portions of the image from the image forming means to the display means through optical coupling of the image forming means to the display means and thereby serving as a light guide between the image forming means and display screen means, said optical fiber means including a plurality of optical fiber which are effectively interlaced together to shift said portions of the image formed by the image forming means.

2. The light guide type display apparatus of claim 1, wherein said image forming means includes a plurality of image forming devices and said plurality of optical fibers are grouped together to form a plurality of optical fiber bundles; each of said optical fiber bundles optically coupling one of said plurality of image forming devices to one of said plurality of individual display surfaces to form one of a plurality of units of the light guide.

3. The light guide type apparatus of claim 1, further including detecting means for detecting the present level of luminance displayed by the display screen means, calculating means for determining a new level of luminance to be displayed by the display screen means based on the present level of luminance detected by the detecting means and feedback means for communicating the new level of luminance to the image forming means.

4. The light guide type apparatus of claim 1, further including driving means for driving the image forming means and wherein the image forming means includes a plurality of image forming devices driven in parallel by the driving means.

5. The light guide type apparatus of claim 1, further including means for serially distributing display data to said image forming means.

6. The light guide type display apparatus of claim 1, further including memory means for storing display data and means for distributing the stored display data to said image forming means.

7. The light guide type display apparatus of claim 1, wherein said image forming means includes light source means for producing light and light shutter means having a plurality of picture elements for controlling the amount of light from said light source means which passes through the light shutter means and forms said image.

8. The light guide type display apparatus of claim 7, wherein the optical fiber means and light shutter means are optically coupled together whereby the angle at which light from the light shutter means strikes the optical fiber means is 30° or less.

9. The light guide type display apparatus of claim 7, wherein the optical fiber means and light shutter means are optically coupled together whereby the incident angle at which light representing the image from the light shutter strikes the optical fiber means produces maximum contrast in the image.

10. The light guide type display apparatus of claim 7, wherein the optical path of light from the light shutter means to the optical fiber means is equal to or less than a value obtained by dividing the picture element length by the tangent of the angle at which light from the light shutter means strikes the optical fiber means.

11. The light guide type display apparatus of claim 1, wherein said optical fiber means includes alignment means for aligning the optical fiber means with the image forming means.

12. The light guide type display apparatus of claim 11, wherein at least one of said optical fibers serves as the alignment means.

13. The light guide type display apparatus of claim 12, wherein the image forming means includes additional alignment means for aligning the optical fiber means with the image forming means.

14. The light guide type display apparatus of claim 13, wherein the image forming means include color filter means for coloring the image; said color filter means including at least one colored area other than a primary color which serves as the additional alignment means.

15. The light guide type display apparatus of claim 1, wherein the image forming means includes a light shutter having a display surface and the optical fiber means has an image input end surface facing the display surface of the light shutter wherein said image input end surface and display surface are shaped to mate with each other and thereby align the image forming means with the optical fiber means.

16. The light guide type display apparatus of claim 15, wherein one of said display surface and image input end surface have a convex shape and the other of said display surface and image input end surface have a concave shape.

17. The light guide type display apparatus of claim 7, wherein said optical fiber means includes alignment means for aligning the optical fiber means with the light shutter means.

18. The light guide type display apparatus of claim 14, wherein at least one of said optical fibers serves as the alignment means.

19. The light guide type display apparatus of claim 18, wherein the image forming means includes additional alignment means for aligning the optical fiber means with the image forming means.

20. The light guide type display apparatus of claim 19, wherein the image forming means include color filter means for coloring the image; said color filter means including at least one colored area other than a primary color which serves as the additional alignment means.

21. The light guide type display apparatus of claim 7, wherein the light shutter has a display surface and the optical fiber means has an image input end surface facing the display surface of the light shutter wherein said image input end surface and display surface are shaped to mate with each other and thereby align the image forming means with the optical fiber means.

22. The light guide type display apparatus of claim 21, wherein one of said display surface and image input end surface have a convex shape and the other of said display surface and image input end surface have a concave shape.

23. The light guide type display apparatus of claim 1, wherein the optical fiber means includes an end face which serves as the display screen means.

24. The light guide type display apparatus of claim 7, wherein the plurality of picture elements includes trios of green, blue and red picture elements; and wherein each optical fiber is optically coupled to at least one trio of green, blue and red picture elements.

25. The light guide type display apparatus of claim 24, wherein each optical fiber is optically coupled to two trios of green, blue and red picture elements.

26. The light guide type display apparatus of claim 1, further including magnifying means for magnifying the image displayed.

27. The light guide type display apparatus of claim 26, wherein the optical fiber means includes a plurality of spacers, said spacers interposed between said optical fibers so as to form columns of optical fibers which are separated from each other by said spacers whereby said spacers serve as said magnifying means.

28. The light guide type display apparatus of claim 27, wherein each column has a plurality of rows with at least one optical fiber per row.

29. The light guide type display apparatus of claim 28, wherein the spacers include means for absorbing light.

30. The light guide type display apparatus of claim 1, further including coupling material for connecting the optical fiber means to the image forming means.

31. The light guide type display apparatus of claim 30, wherein the plurality of optical fibers have cores and the coupling material has a refractive index substantially equal to the cores of the optical fibers.

32. The light guide type display apparatus of claim 1, wherein the image forming means includes at least one liquid crystal display panel.

33. The light guide type display apparatus of claim 32, wherein the image forming means includes a plurality of liquid crystal display panels, each panel optically coupled to one of the plurality of optical fibers.

34. The light guide type display apparatus of claim 1, wherein said image forming means includes two liquid crystal panels each of which includes a polarizing member and further including light source means for producing light and polarization beam splitter means for splitting the light into two different polarized planes wherein light from each of the two different polarized planes is directed toward a different one of the two liquid crystal panels.

35. The light guide type display apparatus of claim 1, further including light source means for generating light and additional light guide means for guiding the light toward the image forming means.

36. The light guide type display apparatus of claim 35, wherein the additional light guide means include a plurality of optical fibers.

37. The light guide type display apparatus of claim 36, wherein the plurality of optical fibers of the additional light guide means surround the light source means.

38. The light guide type display apparatus of claim 37, wherein the plurality of optical fibers of the additional light guide means are irregularly disposed about light source means.

39. The light guide type display apparatus of claim 1, wherein the image forming means includes a liquid crystal projector.

40. The light guide type apparatus of claim 2, further including detecting means for detecting the present level of luminance displayed by the display screen means, calculating means for determining a new level of luminance to be displayed by the display screen means based on the present level of luminance detected by the detecting means and feedback means for communicating the new level of luminance to the image forming means.

41. The light guide type display apparatus of claim 40, wherein said image forming means includes light source means for producing light and light shutter means having a plurality of picture elements for controlling the amount of light from said light source means which passes through the light shutter means and forms said image.

42. The light guide type display apparatus of claim 41, wherein the optical fiber means and light shutter means are optically coupled together whereby the angle at which light from the light shutter means strikes the optical fiber means is 30° or less.

43. The light guide type display apparatus of claim 42, wherein the optical path of light from the light shutter means to the optical fiber means is equal to or less than a value obtained by dividing the picture element length by the tangent of the angle at which light from the light shutter means strikes the optical fiber means.

44. The light guide type display apparatus of claim 43, wherein said optical fiber means includes alignment means for aligning the optical fiber means with the light shutter means.

45. The light guide type display apparatus of claim 44, wherein at least one of said optical fibers serves as the alignment means.

46. The light guide type display apparatus of claim 42, wherein the image forming means includes a light shutter having a display surface and the optical fiber means has an image input end surface facing the display surface of the light shutter wherein said image input end surface and display surface are shaped to mate with each other and thereby align the image forming means with the optical fiber means.

47. The light guide type display apparatus of claim 46, wherein one of said display surface and image input end surface have a convex shape and the other of said display surface and image input end surface have a concave shape.

48. The light guide type display apparatus of claim 42, wherein the optical fiber means includes an end face which serves as the display screen means.

49. The light guide type display apparatus of claim 48, wherein each optical fiber is optically coupled to two trios of green, blue and red picture elements.

50. The light guide type display apparatus of claim 49, further including magnifying means for magnifying the image displayed.

51. The light guide type display apparatus of claim 24, wherein the plurality of picture elements includes trios of green, blue and red picture element; and wherein each optical fibers is optically coupled to at least one trio of green, blue and red picture elements.

52. The light guide type display apparatus of claim 1, further including means for providing display data to said image forming means based on the interlacing of the optical fibers.

53. The light guide type display apparatus of claim 1, further including means for providing display data to said image forming means based on the interlacing of the optical fibers.

54. The light guide type display apparatus of claim 1, wherein said image forming means includes a plurality of image forming devices and said optical fiber means includes a plurality of optical fiber bundles; each of said optical fiber bundles optically coupling one of said plurality of image forming devices to the display screen.

55. The light guide type display apparatus of claim 1, wherein said image forming means includes light source means for producing light and light shutter means having a plurality of picture elements for controlling the amount of light from said light source means which passes through the light shutter means and forms said image; and wherein said optical fiber means includes alignment means for aligning the optical fiber means with the light shutter means; and wherein at least one of said optical fibers serves as the alignment means.

56. A light guide type display apparatus, comprising:
light source means for generating light;
image forming means for forming an image based on controlling the amount of light passing through the image forming means; and
light guide means for optically coupling the light source means to the image forming means, said light guide means including a plurality of optical fibers which surround the light source means.

57. The light guide type display apparatus of claim 56, wherein the plurality of optical fibers are irregularly disposed about light source means.

58. A method of displaying an image on a screen, comprising:
forming an image using a light shutter;
coupling the light shutter to a plurality of optical fiber bundles which are interlaced with each other to shift the image produced by the light shutter; and
dividing the screen into a plurality of units corresponding to the plurality of optical fiber bundles.

59. The method of claim 58, wherein the image is produced using a projection-type optical system.

60. The method of claim 58, wherein the image is produced using a plurality of liquid display panels.

61. The method of claim 60, further including driving the plurality of display panels in parallel.

62. The method of claim 58, further including detecting the level of luminance of the displayed image; calculating the average detected luminance of the displayed image; and providing a new level of luminance for the displayed image based on the average.

63. The method of claim 62, further including communicating a change to a light source of the amount of light to be directed toward the light shutter.

* * * * *